United States Patent
Chen

(10) Patent No.: US 11,447,148 B2
(45) Date of Patent: Sep. 20, 2022

(54) VEHICLE WARNING METHOD AND RELATED APPARATUS

(71) Applicant: HUAWEI CLOUD COMPUTING TECHNOLOGIES CO., LTD., Gui'an New District (CN)

(72) Inventor: Xiaoguang Chen, Xi'an (CN)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 0 days.

(21) Appl. No.: 17/329,860

(22) Filed: May 25, 2021

(65) Prior Publication Data

US 2021/0276586 A1 Sep. 9, 2021

Related U.S. Application Data

(63) Continuation of application No. PCT/CN2019/104184, filed on Sep. 3, 2019.

(30) Foreign Application Priority Data

Nov. 26, 2018 (CN) .......................... 201811419443.9

(51) Int. Cl.
*B60W 50/14* (2020.01)
*B60W 40/12* (2012.01)
(Continued)

(52) U.S. Cl.
CPC ............ *B60W 50/14* (2013.01); *B60W 40/12* (2013.01); *G08G 1/161* (2013.01); *G08G 1/166* (2013.01);
(Continued)

(58) Field of Classification Search
CPC ... B60W 2050/146; B60W 2554/4041; B60W 2556/65; B60W 40/12; B60W 50/14;
(Continued)

(56) References Cited

U.S. PATENT DOCUMENTS

2012/0065858 A1* 3/2012 Nickolaou ............. B60Q 9/008
701/1
2013/0054086 A1 2/2013 Lo et al.
(Continued)

FOREIGN PATENT DOCUMENTS

CN 101687509 A 3/2010
CN 101751703 A 6/2010
(Continued)

OTHER PUBLICATIONS

Chinese Office Action issued in corresponding Chinese Application No. 201811419443.9, dated Feb. 25, 2021, pp. 1-10.
(Continued)

*Primary Examiner* — Sisay Yacob
(74) *Attorney, Agent, or Firm* — Hauptman Ham, LLP

(57) ABSTRACT

A vehicle warning method, to avoid misjudgment caused by factors such as map precision and lane infringement of a vehicle, thereby improving warning accuracy. The method includes: A vehicle-to-everything V2X device receives a V2X message corresponding to a first vehicle. The V2X device determines, based on the V2X message, whether the first vehicle is in a warning area. The warning area is determined based on vehicle information of a second vehicle. The vehicle information includes at least position information of the second vehicle and a vehicle size of the second vehicle. The V2X device outputs warning information corresponding to the first vehicle to the second vehicle.

17 Claims, 15 Drawing Sheets

(51) Int. Cl.
*G08G 1/16* (2006.01)
*H04W 4/40* (2018.01)

(52) U.S. Cl.
CPC ........ *H04W 4/40* (2018.02); *B60W 2050/146* (2013.01); *B60W 2554/4041* (2020.02); *B60W 2556/65* (2020.02)

(58) Field of Classification Search
CPC ...... G07C 5/008; G07C 5/0816; G08G 1/161; G08G 1/163; G08G 1/164; G08G 1/166; G08G 1/167; H04W 4/40; H04W 4/90
See application file for complete search history.

(56) References Cited

U.S. PATENT DOCUMENTS

| | | | |
|---|---|---|---|
| 2015/0339533 | A1 | 11/2015 | Liu et al. |
| 2017/0018187 | A1* | 1/2017 | Kim .................. H04L 67/12 |
| 2017/0028911 | A1* | 2/2017 | Medenica ........... G08B 21/06 |
| 2017/0057497 | A1 | 3/2017 | Laur et al. |
| 2017/0253181 | A1* | 9/2017 | Choi .................. G06T 11/00 |
| 2018/0096605 | A1* | 4/2018 | Bai .................... G08G 1/166 |
| 2018/0292832 | A1 | 10/2018 | Bae et al. |

FOREIGN PATENT DOCUMENTS

| | | |
|---|---|---|
| CN | 102460536 A | 5/2012 |
| CN | 103903479 A | 7/2014 |
| CN | 104210489 A | 12/2014 |
| CN | 104269073 A | 1/2015 |
| CN | 104309529 A | 1/2015 |
| CN | 104751669 A | 7/2015 |
| CN | 105761546 A | 7/2016 |
| CN | 106004655 A | 10/2016 |
| CN | 106097775 A | 11/2016 |
| CN | 106340196 A | 1/2017 |
| CN | 106428001 A | 2/2017 |
| CN | 205930493 U | 2/2017 |
| CN | 106476697 A | 3/2017 |
| CN | 106485950 A | 3/2017 |
| CN | 106971579 A | 7/2017 |
| CN | 107487258 A | 12/2017 |
| CN | 107487333 A | 12/2017 |
| CN | 107591025 A | 1/2018 |
| CN | 107613527 A | 1/2018 |
| CN | 107615355 A | 1/2018 |
| CN | 108490471 A | 9/2018 |
| CN | 108845327 A | 11/2018 |
| EP | 3457384 A2 | 3/2019 |
| JP | 2003151096 A | 5/2003 |
| WO | 2016147584 A1 | 9/2016 |
| WO | 2018128946 A1 | 7/2018 |

OTHER PUBLICATIONS

Chinese Office Action issued in corresponding Chinese Application No. 201811419443.9, dated Jul. 12, 2021, pp. 1-11.
International Search Report issued in corresponding International Application No. PCT/CN2019/104184, dated Nov. 28, 2019, pp. 1-10.
European Search Report issued in corresponding European Application No. 19891317.0, dated Nov. 23, 2021, pp. 1-9, European Patent Office, Munich, Germany.
Chinese Office Action issued in corresponding Chinese Application No. 201811419443.9, dated Nov. 25, 2021, pp. 1-9.
Chinese Notice of Allowance issued in corresponding Chinese Application No. 201811419443.9, dated Jul. 27, 2022, pp. 1-4.

* cited by examiner

VEHICLE WARNING METHOD AND RELATED APPARATUS

CROSS-REFERENCE TO RELATED APPLICATIONS

This application is a continuation of International Application No. PCT/CN2019/104184, filed on Sep. 3, 2019, which claims priority to Chinese Patent Application No. 201811419443.9, filed on Nov. 26, 2018, both of which are hereby incorporated by reference in their entireties.

BACKGROUND

To improve security and intelligence of a transportation system, a concept of an intelligent transportation system is gradually emerging. In intelligent transportation, a new-generation communications network and a data processing capability may be used to improve overall efficiency of an existing transportation system, reduce energy consumption, and improve transportation security and convenience. In recent years, development of the intelligent transportation system mainly focuses on the intelligent road transportation system field which is commonly referred to as vehicle to everything (V2X). In a V2X technology, wireless communication between vehicles, between a vehicle and a roadside infrastructure, and between the vehicle and a pedestrian is used to detect a surrounding environment of the vehicle in real time and provide a timely warning. This technology has become a research hotspot for addressing road safety issues in countries around the world.

In some solutions, a server collects latitude and longitude data and direction data of a host vehicle (HV) and a remote vehicle (RV) through the V2X technology, to obtain a horizontal distance and a longitudinal distance between the two vehicles and moving directions of the two vehicles. Then, the server determines whether the two vehicles are in a same moving direction. If yes, lanes in which the two vehicles are located are determined based on a map. If the lanes in which the two vehicles are located are adjacent to each other, a possibility of a collision risk between the two vehicles is further calculated based on a relative distance between the two vehicles, and a user is prompted based on a calculation result.

The foregoing solutions depend on the map for recognition. If map data is not precise enough, recognition accuracy is affected. In addition, in actual application, the vehicle may have behaviors such as lane infringement or lane-riding. These behaviors may cause misjudgment of the server.

SUMMARY

Embodiments of this application provide a vehicle warning method, to avoid misjudgment caused by factors such as map precision and lane infringement of a vehicle, thereby improving warning accuracy.

In view of this, a first aspect of this application provides a vehicle warning method. The method includes: a V2X device receives a V2X message corresponding to a first vehicle. When the V2X device determines, based on the V2X message, that the first vehicle is a dangerous vehicle in a warning area of a second vehicle, the V2X device outputs warning information corresponding to the second vehicle. In this implementation, the warning area of the second vehicle is determined based on vehicle information of the second vehicle. The vehicle information includes at least position information of the second vehicle and a vehicle size of the second vehicle.

It should be noted that the V2X message corresponding to the first vehicle includes at least position information of the first vehicle. The position information described in this implementation is information that is used to determine a vehicle position.

In this implementation, after receiving the V2X message corresponding to the first vehicle, the V2X device may determine, based on the V2X message, that the first vehicle is a dangerous vehicle in the warning area, and output the warning information corresponding to the second vehicle. The warning area corresponds to the vehicle information of the second vehicle. The vehicle information includes first position information and the vehicle size. In this embodiment, the warning area of the vehicle is set based on a position and a size of the vehicle. When there is a vehicle in the warning area, and the vehicle meets a warning condition of the warning area, an alarm is triggered. In other words, in this embodiment, a dangerous vehicle having a collision risk may be obtained through analysis without depending on a map. This is easy to implement, and may also avoid misjudgment caused by factors such as map precision and lane infringement of the vehicle, thereby improving recognition accuracy.

With reference to the first aspect of this application, in a first implementation of the first aspect, the warning area includes a left blind spot warning area and/or a right blind spot warning area. The vehicle size of the second vehicle includes a vehicle length and a vehicle width of the second vehicle. The vehicle information of the second vehicle further includes a driver seat position of the second vehicle.

If the driver seat position is located on a left side in the second vehicle, the left blind spot warning area is located behind a left B-pillar of the second vehicle. A length of the left blind spot warning area is positively correlated with the vehicle length. A width of the left blind spot warning area is positively correlated with the vehicle width. The right blind spot warning area is located behind a right rear view mirror of the second vehicle. A length of the right blind spot warning area is positively correlated with the vehicle length. A width of the right blind spot warning area is positively correlated with the vehicle width.

If the driver seat position is located on a right side in the second vehicle, the right blind spot warning area is located behind a right B-pillar of the second vehicle. The length of the right blind spot warning area is positively correlated with the vehicle length. The width of the right blind spot warning area is positively correlated with the vehicle width. The left blind spot warning area is located behind a left rear view mirror of the second vehicle. The length of the left blind spot warning area is positively correlated with the vehicle length. The width of the left blind spot warning area is positively correlated with the vehicle width.

It should be noted that the B-pillars of the vehicle are located between front and rear seats of a cockpit, and are vertical bars between two doors on both sides, extending from a roof to a bottom of the vehicle. The driver seat position is used to indicate whether a driver seat of the vehicle is on the left side or the right side in the vehicle. Positive correlation between two parameters means that the two variables have a same change direction. For example, positive correlation between an area length and the vehicle length means that a longer vehicle length indicates a longer area length.

This implementation provides a specific manner of determining the warning area based on the vehicle size, thereby improving implementability of the solution.

With reference to the first implementation of the first aspect of this application, in a second implementation of the first aspect, the V2X message corresponding to the first vehicle includes the position information of the first vehicle and an orientation of the first vehicle. The vehicle information of the second vehicle further includes an orientation of the second vehicle. In this case, the V2X device may determine, based on the V2X message in the following manner, that the first vehicle is a dangerous vehicle in the left blind spot warning area and/or the right blind spot warning area.

The V2X device determines a current spatial position of the first vehicle based on the position information of the first vehicle. If the current spatial position of the first vehicle is in the left blind spot warning area (or the right blind spot warning area), and the orientation of the first vehicle is the same as the orientation of the second vehicle, the V2X device determines that the first vehicle is a dangerous vehicle in the left blind spot warning area (or the right blind spot warning area).

Correspondingly, in this implementation, the warning information output by the V2X device may be used to indicate that there is a dangerous vehicle in the left blind spot warning area (or the right blind spot warning area).

In this implementation, the V2X device may perform warning recognition on a vehicle in a blind spot warning area, to avoid that the vehicle collides with a vehicle that is in a blind spot.

With reference to the first aspect of this application, in a third implementation of the first aspect, the warning area includes a forward collision warning area. The vehicle size of the second vehicle includes a vehicle width of the second vehicle. The vehicle information of the second vehicle further includes a vehicle speed of the second vehicle. The forward collision warning area is located in front of the second vehicle. A width of the forward collision warning area is positively correlated with the vehicle width of the second vehicle. A length of the forward collision warning area is positively correlated with the vehicle speed of the second vehicle.

In this implementation, the forward collision warning area of the vehicle is determined based on the vehicle size and the vehicle speed, and a size of the area may change with the vehicle speed. This is more flexible.

With reference to the third implementation of the first aspect of this application, in a fourth implementation of the first aspect, the V2X message corresponding to the first vehicle includes the position information of the first vehicle. In this case, the V2X device may determine, based on the V2X message in the following manner, that the first vehicle is a dangerous vehicle in the forward collision warning area.

The V2X device determines a current spatial position of the first vehicle based on the position information of the first vehicle. If the current spatial position of the first vehicle is in the forward collision warning area, the V2X device determines that the first vehicle is a dangerous vehicle in the forward collision warning area.

Correspondingly, in this implementation, the warning information output by the V2X device may be used to indicate that there is a dangerous vehicle in the forward collision warning area.

In this implementation, the V2X device may perform warning recognition on a vehicle in the forward collision warning area, to avoid a rear-end collision caused by the vehicle following too close to a vehicle.

With reference to the first aspect, in a fifth implementation of the first aspect, the warning area includes an emergency electronic brake light area. The emergency electronic brake light area is located in front of the second vehicle. A width of the emergency electronic brake light area is equal to the width of the forward collision warning area. A length of the emergency electronic brake light area is positively correlated with the length of the forward collision warning area. The emergency electronic brake light area includes the forward collision warning area.

This implementation provides another manner of determining the warning area, thereby improving flexibility of the solution.

With reference to the fifth implementation of the first aspect of this application, in a sixth implementation of the first aspect, the V2X message corresponding to the first vehicle includes the position information of the first vehicle and a brake light status of the first vehicle. In this case, the V2X device may determine, based on the V2X message in the following manner, that the first vehicle is a dangerous vehicle in the emergency electronic brake light warning area.

The V2X device determines a current spatial position of the first vehicle based on the position information of the first vehicle. If the current spatial position of the first vehicle is in the emergency electronic brake light area, and the brake light status of the first vehicle is on, it is determined that the first vehicle is a dangerous vehicle in the emergency electronic brake light area of the second vehicle.

Correspondingly, in this implementation, the warning information output by the V2X device may be used to indicate that there is a dangerous vehicle in the emergency electronic brake light area.

In this implementation, a vehicle in the emergency electronic brake light warning area may be recognized, so that a user brakes in advance, to avoid a rear-end collision caused by emergency braking.

With reference to the first aspect of this application, in a seventh implementation of the first aspect, the warning area includes a left do-not-pass warning area and/or a right do-not-pass warning area. The vehicle size includes a vehicle width and a vehicle length.

The left do-not-pass warning area is located in left front of a left side of a head of the second vehicle. A length of the left do-not-pass area is positively correlated with the vehicle length. A width of the left do-not-pass area is positively correlated with the vehicle width. The length of the left do-not-pass area is greater than the width of the left do-not-pass area.

The right do-not-pass warning area is located in right front of a right side of the head of the second vehicle. A length of the right do-not-pass area is positively correlated with the vehicle length. A width of the right do-not-pass area is positively correlated with the vehicle width. The length of the right do-not-pass area is greater than the width of the right do-not-pass area.

This implementation provides another manner of determining the warning area, thereby improving the flexibility of the solution.

With reference to the seventh implementation of the first aspect of this application, in an eighth implementation of the first aspect, the V2X message corresponding to the first vehicle includes the position information of the first vehicle, an orientation of the first vehicle, and a speed of the first vehicle. The vehicle information of the second vehicle further includes a vehicle orientation of the second vehicle. Correspondingly, the V2X device may determine, in the following manner based on the V2X message corresponding to the first vehicle, that the first vehicle is a dangerous vehicle in the left do-not-pass warning area or the right do-not-pass warning area.

The V2X device determines a current spatial position of the first vehicle based on the position information of the second vehicle. If the current spatial position of the first vehicle is in the left do-not-pass warning area (or the right do-not-pass warning area), the speed of the first vehicle is not zero, and the orientation of the first vehicle is opposite to an orientation of the second vehicle, the V2X device determines that the first vehicle is a dangerous vehicle in the left do-not-pass warning area (or the right do-not-pass warning area) of the second vehicle.

Correspondingly, in this implementation, the warning information output by the V2X device may be used to indicate that there is a dangerous vehicle in the left do-not-pass warning area (or the right do-not-pass warning area).

In this implementation, a vehicle in a do-not-pass warning area may be recognized, to avoid that the vehicle collides with a vehicle moving in a reverse direction.

With reference to the first aspect of this application, in a ninth implementation of the first aspect, the warning area includes a left intersection movement assist area and/or a right intersection movement assist area. The vehicle size includes a vehicle width and a vehicle length.

The left intersection movement assist area is located in left front of a left side of a head of the second vehicle. A length of the left intersection movement assist area is positively correlated with the vehicle length. A width of the left intersection movement assist area is positively correlated with the vehicle width.

The right assist area is located in right front of a right side of the head of the second vehicle. A length of the right intersection movement assist area is positively correlated with the vehicle length. A width of the right intersection movement assist area is positively correlated with the vehicle width.

This implementation provides another specific manner of determining the warning area, thereby improving the flexibility of the solution.

With reference to the ninth implementation of the first aspect of this application, in a tenth implementation of the first aspect, the V2X message corresponding to the first vehicle includes the position information of the first vehicle, an orientation of the first vehicle, and a speed of the first vehicle. The vehicle information of the second vehicle further includes an orientation of the second vehicle. Correspondingly, the V2X device may determine, in the following manner based on the V2X message corresponding to the first vehicle, that the first vehicle is a dangerous vehicle in the left intersection movement assist area or the right intersection movement assist area.

The V2X device determines a current spatial position of the first vehicle based on the position information of the first vehicle. If the current spatial position of the first vehicle is in the left intersection movement assist area (or the right intersection movement assist area), the speed of the first vehicle is not zero, and the orientation of the first vehicle intersects the orientation of the second vehicle, the V2X device determines that the first vehicle is a dangerous vehicle in the left intersection movement assist area (or the right intersection movement assist area) of the second vehicle.

Correspondingly, in this implementation, the warning information output by the V2X device may be used to indicate that there is a dangerous vehicle in the left intersection movement assist area (or the right intersection movement assist area).

In this implementation, a vehicle in an intersection movement assist area may be recognized, to assist the user in safely passing through an intersection, and avoid a collision at the intersection.

With reference to any one of the first aspect of this application or the first to the tenth implementations of the first aspect, in an eleventh implementation of the first aspect of this application, the position information includes a GPS measurement result and at least one of the following: a GPS antenna position or GPS measurement precision.

In this implementation, a vehicle may be positioned based on the GPS antenna position and/or the GPS measurement precision. This improves positioning precision.

With reference to the eleventh implementation of the first aspect of this application, in a twelfth implementation of the first aspect of this application, the V2X device is a vehicle-mounted device. Before the V2X device determines, based on the V2X message, that the first vehicle is a dangerous vehicle in the warning area, the following steps may be performed: The V2X device determines a current spatial position of the second vehicle based on the position information of the second vehicle and the vehicle size, and then determines the warning area of the second vehicle based on the current spatial position of the second vehicle and the vehicle size.

This implementation provides a manner of determining the warning area by the vehicle-mounted device, thereby improving the implementability of the solution.

With reference to the eleventh implementation of the first aspect of this application, in a thirteenth implementation of the first aspect of this application, the V2X device is a vehicle-mounted device. Before the V2X device determines, based on the V2X message, that the first vehicle is a dangerous vehicle in the warning area, the following steps may be performed: The V2X device sends the vehicle information of the second vehicle to a server. The vehicle information includes the position information of the second vehicle and the vehicle size. In this case, after receiving the vehicle information of the second vehicle, the server may determine a current spatial position of the second vehicle based on the position information of the second vehicle, determine a warning area based on the current spatial position of the second vehicle and the vehicle size, and then return the determined warning area to the V2X device. The V2X device receives the warning area sent by the server.

This implementation provides another manner of determining the warning area by the vehicle-mounted device, thereby improving the flexibility of the solution.

With reference to the eleventh implementation of the first aspect of this application, in a fourteenth implementation of the first aspect of this application, the V2X device is a server. Before the V2X device determines, based on the V2X message, that the first vehicle is a dangerous vehicle in the warning area, the following steps may be performed: The V2X device receives the vehicle information of the second vehicle sent by a vehicle-mounted device, determines a current spatial position of the second vehicle based on the position information in the vehicle information, and then determines the warning area of the second vehicle based on the current spatial position of the second vehicle and the vehicle size in the vehicle information.

This implementation provides a manner of determining the warning area by the server, thereby improving the implementability of the solution.

With reference to the eleventh implementation of the first aspect of this application, in a fifteenth implementation of the first aspect of this application, the V2X device is a server. Before the V2X device determines, based on the V2X message, that the first vehicle is a dangerous vehicle in the warning area, the following step may be performed: The V2X device receives a warning area sent by a vehicle-mounted device. The warning area is determined by the vehicle-mounted device based on a current spatial position of the second vehicle and the vehicle size.

This implementation provides another manner of determining the warning area by the server, thereby improving the flexibility of the solution.

With reference to the twelfth or the thirteenth implementation of the first aspect of this application, in a sixteenth implementation of the first aspect of this application, the V2X device may output the warning information corresponding to the second vehicle in the following manner: The V2X device displays the warning information on a dashboard of the second vehicle. The warning information is used to indicate to the user that there is a dangerous vehicle in the warning area. Alternatively, the warning information corresponding to the second vehicle is output in the following manner: The V2X device prompts, through a voice, the user that there is a dangerous vehicle in the warning area.

This implementation provides a plurality of manners of outputting the warning information by the vehicle-mounted device, thereby improving the flexibility of the solution.

With reference to the fourteenth or the fifteenth implementation of the first aspect of this application, in a seventeenth implementation of the first aspect of this application, the V2X device may output the warning information corresponding to the second vehicle in the following manner: The V2X device sends notification information to the vehicle-mounted device, so that the vehicle-mounted device is enabled to indicate, based on the notification information, to a user corresponding to the second vehicle that there is a dangerous vehicle in the warning area.

This implementation provides a manner of outputting the warning information by the server, thereby improving the implementability of the solution.

A second aspect of this application provides another vehicle warning method. The method includes: A vehicle-mounted device determines a current spatial position of a second vehicle based on position information of the second vehicle, determines a warning area of the second vehicle based on the current spatial position of the second vehicle and a vehicle size, and sends the warning area of the second vehicle to a server. In this case, the server is enabled to determine, based on a V2X message of a first vehicle, that the first vehicle is a dangerous vehicle in the warning area of the second vehicle, and send a notification message to the vehicle-mounted device when determining that the first vehicle is a dangerous vehicle in the warning area of the second vehicle. The vehicle-mounted device receives the notification message, and prompts a user that there is a dangerous vehicle in the warning area.

In this implementation, the warning area of the vehicle is set based on a position and a size of the vehicle. When there is a vehicle in the warning area, and the vehicle meets a warning condition of the warning area, an alarm is triggered. In other words, in this embodiment, a dangerous vehicle having a collision risk may be obtained through analysis without depending on a map. This is easy to implement, and may also avoid misjudgment caused by factors such as map precision and lane-infringement of the vehicle, thereby improving recognition accuracy.

With reference to the second aspect of this application, in a possible implementation, the position information includes a GPS measurement result and at least one of the following: GPS measurement precision and a GPS antenna position.

In this implementation, a vehicle may be positioned based on the GPS antenna position and/or the GPS measurement precision. This improves positioning precision.

With reference to the second aspect of this application, in a possible implementation, the warning area includes a left blind spot warning area and/or a right blind spot warning area. The vehicle size of the second vehicle includes a vehicle length and a vehicle width of the second vehicle. The vehicle information of the second vehicle further includes a driver seat position of the second vehicle.

If the driver seat position is located on a left side in the second vehicle, the left blind spot warning area is located behind a left B-pillar of the second vehicle. A length of the left blind spot warning area is positively correlated with the vehicle length. A width of the left blind spot warning area is positively correlated with the vehicle width. The right blind spot warning area is located behind a right rear view mirror of the second vehicle. A length of the right blind spot warning area is positively correlated with the vehicle length. A width of the right blind spot warning area is positively correlated with the vehicle width.

If the driver seat position is located on a right side in the second vehicle, the right blind spot warning area is located behind a right B-pillar of the second vehicle. The length of the right blind spot warning area is positively correlated with the vehicle length. The width of the right blind spot warning area is positively correlated with the vehicle width. The left blind spot warning area is located behind a left rear view mirror of the second vehicle. The length of the left blind spot warning area is positively correlated with the vehicle length. The width of the left blind spot warning area is positively correlated with the vehicle width.

It should be noted that the B-pillars of the vehicle are located between front and rear seats of a cockpit, and are vertical bars between two doors on both sides, extending from a roof to a bottom of the vehicle. The driver seat position is used to indicate whether a driver seat of the vehicle is on the left side or the right side in the vehicle. Positive correlation between two parameters means that the two variables have a same change direction. For example, positive correlation between an area length and the vehicle length means that a longer vehicle length indicates a longer area length.

This implementation provides a specific manner of determining the warning area based on the vehicle size, thereby improving implementability of the solution.

With reference to the second aspect of this application, in a possible implementation, the warning area includes a forward collision warning area. The vehicle size of the second vehicle includes a vehicle width of the second vehicle. The vehicle information of the second vehicle further includes a vehicle speed of the second vehicle. The forward collision warning area is located in front of the second vehicle. A width of the forward collision warning area is positively correlated with the vehicle width of the second vehicle. A length of the forward collision warning area is positively correlated with the vehicle speed of the second vehicle.

In this implementation, the forward collision warning area of the vehicle is determined based on the vehicle size and the vehicle speed, and a size of the area may change with the vehicle speed. This is more flexible.

With reference to second aspect, in a possible implementation, the warning area includes an emergency electronic brake light area. The emergency electronic brake light area is located in front of the second vehicle. A width of the emergency electronic brake light area is equal to the width of the forward collision warning area. A length of the emergency electronic brake light area is positively correlated with the length of the forward collision warning area. The emergency electronic brake light area includes the forward collision warning area.

This implementation provides another specific manner of determining the warning area, thereby improving flexibility of the solution.

With reference to the second aspect of this application, in a possible implementation, the warning area includes a left do-not-pass warning area and/or a right do-not-pass warning area. The vehicle size includes a vehicle width and a vehicle length.

The left do-not-pass warning area is located in left front of a left side of a head of the second vehicle. A length of the left do-not-pass area is positively correlated with the vehicle length. A width of the left do-not-pass area is positively correlated with the vehicle width. The length of the left do-not-pass area is greater than the width of the left do-not-pass area.

The right do-not-pass warning area is located in right front of a right side of the head of the second vehicle. A length of the right do-not-pass area is positively correlated with the vehicle length. A width of the right do-not-pass area is positively correlated with the vehicle width. The length of the right do-not-pass area is greater than the width of the right do-not-pass area.

This implementation provides another specific manner of determining the warning area, thereby improving the flexibility of the solution.

With reference to the second aspect of this application, in a possible implementation, the warning area includes a left intersection movement assist area and/or a right intersection movement assist area. The vehicle size includes a vehicle width and a vehicle length.

The left intersection movement assist area is located in left front of a left side of a head of the second vehicle. A length of the left intersection movement assist area is positively correlated with the vehicle length. A width of the left intersection movement assist area is positively correlated with the vehicle width.

The right assist area is located in right front of a right side of the head of the second vehicle. A length of the right intersection movement assist area is positively correlated with the vehicle length. A width of the right intersection movement assist area is positively correlated with the vehicle width.

This implementation provides another specific manner of determining the warning area, thereby improving the flexibility of the solution.

With reference to the second aspect of this application, in a possible implementation, a vehicle-mounted device may output warning information corresponding to the second vehicle in the following manners: displaying the warning information on a dashboard of the second vehicle, where the warning information is used to indicate to a user that there is a dangerous vehicle in the warning area, or prompting, through a voice, the user that there is a dangerous vehicle in the warning area.

This implementation provides a plurality of manners of outputting the warning information by the vehicle-mounted device, thereby improving the flexibility of the solution.

A third aspect of this application provides a vehicle warning method. The method includes: A server receives vehicle information of a second vehicle sent by a vehicle-mounted device, determines a current spatial position of the second vehicle based on position information in the vehicle information, determines a warning area of the second vehicle based on the current spatial position of the second vehicle and a vehicle size, and sends the warning area of the second vehicle to the vehicle-mounted device. In this case, the vehicle-mounted device determines, based on a V2X message corresponding to a first vehicle, that the first vehicle is a dangerous vehicle in the warning area of the second vehicle, and outputs warning information when determining that the first vehicle is a dangerous vehicle in the warning area of the second vehicle.

In this implementation, the warning area of the vehicle is set based on a position and a size of the vehicle. When there is a vehicle in the warning area, and the vehicle meets a warning condition of the warning area, an alarm is triggered. In other words, in this embodiment, a dangerous vehicle having a collision risk may be obtained through analysis without depending on a map. This is easy to implement, and may also avoid misjudgment caused by factors such as map precision and lane-infringement of the vehicle, thereby improving recognition accuracy.

With reference to the second aspect of this application, in a possible implementation, the position information of the second vehicle includes a GPS measurement result and at least one of the following: GPS measurement precision and a GPS antenna position.

In this implementation, a vehicle may be positioned based on the GPS antenna position and/or the GPS measurement precision. This improves positioning precision.

With reference to the third aspect of this application, in a possible implementation, the warning area includes a left blind spot warning area and/or a right blind spot warning area. The vehicle size of the second vehicle includes a vehicle length and a vehicle width of the second vehicle. The vehicle information of the second vehicle further includes a driver seat position of the second vehicle.

If the driver seat position is located on a left side in the second vehicle, the left blind spot warning area is located behind a left B-pillar of the second vehicle. A length of the left blind spot warning area is positively correlated with the vehicle length. A width of the left blind spot warning area is positively correlated with the vehicle width. The right blind spot warning area is located behind a right rear view mirror of the second vehicle. A length of the right blind spot warning area is positively correlated with the vehicle length. A width of the right blind spot warning area is positively correlated with the vehicle width.

If the driver seat position is located on a right side in the second vehicle, the right blind spot warning area is located behind a right B-pillar of the second vehicle. The length of the right blind spot warning area is positively correlated with the vehicle length. The width of the right blind spot warning area is positively correlated with the vehicle width. The left blind spot warning area is located behind a left rear view mirror of the second vehicle. The length of the left blind spot warning area is positively correlated with the vehicle length. The width of the left blind spot warning area is positively correlated with the vehicle width.

It should be noted that the B-pillars of the vehicle are located between front and rear seats of a cockpit, and are vertical bars between two doors on both sides, extending from a roof to a bottom of the vehicle. The driver seat position is used to indicate whether a driver seat of the vehicle is on the left side or the right side in the vehicle. Positive correlation between two parameters means that the two variables have a same change direction. For example, positive correlation between an area length and the vehicle length means that a longer vehicle length indicates a longer area length.

This implementation provides a specific manner of determining the warning area based on the vehicle size, thereby improving implementability of the solution.

With reference to the third aspect of this application, in a possible implementation, the warning area includes a forward collision warning area. The vehicle size of the second vehicle includes a vehicle width of the second vehicle. The vehicle information of the second vehicle further includes a vehicle speed of the second vehicle. The forward collision warning area is located in front of the second vehicle. A width of the forward collision warning area is positively correlated with the vehicle width of the second vehicle. A length of the forward collision warning area is positively correlated with the vehicle speed of the second vehicle.

In this implementation, the forward collision warning area of the vehicle is determined based on the vehicle size and the vehicle speed, and a size of the area may change with the vehicle speed. This is more flexible.

With reference to third aspect, in a possible implementation, the warning area includes an emergency electronic brake light area. The emergency electronic brake light area is located in front of the second vehicle. A width of the emergency electronic brake light area is equal to the width of the forward collision warning area. A length of the emergency electronic brake light area is positively correlated with the length of the forward collision warning area. The emergency electronic brake light area includes the forward collision warning area.

This implementation provides another specific manner of determining the warning area, thereby improving flexibility of the solution.

With reference to the third aspect of this application, in a possible implementation, the warning area includes a left do-not-pass warning area and/or a right do-not-pass warning area. The vehicle size includes a vehicle width and a vehicle length.

The left do-not-pass warning area is located in left front of a left side of a head of the second vehicle. A length of the left do-not-pass area is positively correlated with the vehicle length. A width of the left do-not-pass area is positively correlated with the vehicle width. The length of the left do-not-pass area is greater than the width of the left do-not-pass area.

The right do-not-pass warning area is located in right front of a right side of the head of the second vehicle. A length of the right do-not-pass area is positively correlated with the vehicle length. A width of the right do-not-pass area is positively correlated with the vehicle width. The length of the right do-not-pass area is greater than the width of the right do-not-pass area.

This implementation provides another specific manner of determining the warning area, thereby improving the flexibility of the solution.

With reference to the third aspect of this application, in a possible implementation, the warning area includes a left intersection movement assist area and/or a right intersection movement assist area. The vehicle size includes a vehicle width and a vehicle length.

The left intersection movement assist area is located in left front of a left side of a head of the second vehicle. A length of the left intersection movement assist area is positively correlated with the vehicle length. A width of the left intersection movement assist area is positively correlated with the vehicle width.

The right assist area is located in right front of a right side of the head of the second vehicle. A length of the right intersection movement assist area is positively correlated with the vehicle length. A width of the right intersection movement assist area is positively correlated with the vehicle width.

This implementation provides another specific manner of determining the warning area, thereby improving the flexibility of the solution.

A fourth aspect of this application provides a vehicle-mounted device. The vehicle-mounted device has a function of implementing the V2X device in the first aspect, the first to the thirteenth and the sixteenth implementations of the first aspect. The function may be implemented by hardware, or may be implemented by hardware executing corresponding software. The hardware or the software includes one or more modules corresponding to the function.

A fifth aspect of this application provides a server. The server has a function of implementing the V2X device in the first aspect, the first to the eleventh, the fourteenth, the fifteenth, and the seventeenth implementations of the first aspect. The function may be implemented by hardware, or may be implemented by hardware executing corresponding software. The hardware or the software includes one or more modules corresponding to the function.

A sixth aspect of this application provides a vehicle-mounted device. The vehicle-mounted device has a function of implementing the vehicle-mounted device in each implementation of the second aspect. The function may be implemented by hardware, or may be implemented by hardware executing corresponding software. The hardware or the software includes one or more modules corresponding to the function.

A seventh aspect of this application provides a server. The server has a function of implementing the server in each implementation of the third aspect. The function may be implemented by hardware, or may be implemented by hardware executing corresponding software. The hardware or the software includes one or more modules corresponding to the function.

An eighth aspect of this application provides a computer-readable storage medium, including an instruction. When the instruction is run on a computer, the computer is enabled to perform the method according to the first aspect, the second aspect, or the third aspect.

A ninth aspect of this application provides a computer program product including an instruction. When the computer program product runs on a computer, the computer is enabled to perform the method according to the first aspect, the second aspect, or the third aspect.

According to the foregoing technical solutions, it can be learned that the embodiments of this application have the following advantages:

In the embodiments of this application, after receiving the V2X message corresponding to the first vehicle, the V2X device may determine, based on the V2X message, that the first vehicle is a dangerous vehicle in the warning area, and output the warning information corresponding to the second vehicle. The warning area corresponds to the vehicle information of the second vehicle. The vehicle information includes first position information and the vehicle size. In this embodiment, the warning area of the vehicle is set based on the position and the size of the vehicle. When there is a vehicle in the warning area, and the vehicle meets the warning condition of the warning area, the alarm is triggered. In other words, in this embodiment, the dangerous vehicle having the collision risk may be obtained through analysis without depending on the map. This is easy to implement, and may also avoid the misjudgment caused by the factors such as the map precision and the lane infringement of the vehicle, thereby improving the recognition accuracy.

BRIEF DESCRIPTION OF DRAWINGS

To describe the technical solutions in the embodiments of this application more clearly, the following briefly describes the accompanying drawings for describing the embodiments. Apparently, the accompanying drawings in the following description show merely some embodiments of this application.

DESCRIPTION OF EMBODIMENTS

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of this application described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

For ease of understanding, the following describes vehicle parameters in the embodiments of this application.

Figure 1A:
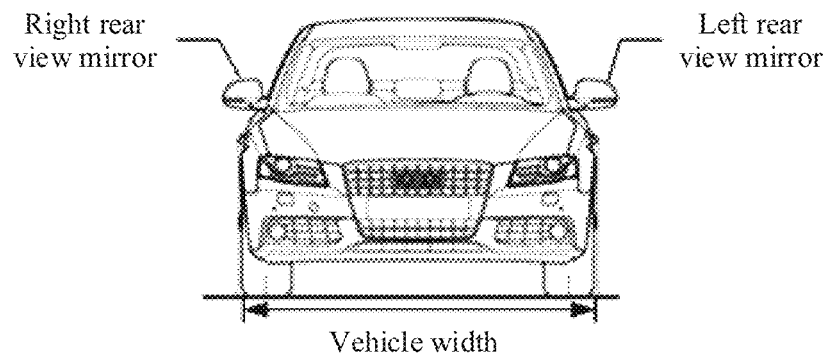
FIG. 1A is a main view of a vehicle according to an embodiment of this application.

FIG. 1A is a main view of a vehicle. A vehicle width in the embodiments of this application is a distance between two extreme points in a width direction of the vehicle, namely, a distance between most protruding positions of left and right sides of a vehicle body. According to a general rule in the industry, the vehicle body width does not include protruding widths of left and right rear view mirrors. In other words, the most protruding positions should be selected after the rear view mirrors are folded.

In the embodiments of this application, the rear view mirror is a tool used by a driver sitting on a cab seat to directly obtain external information such as information about the rear, a side, and a bottom of the vehicle. Generally, the rear-view mirror is located on a vehicle door. There is a rear-view mirror on each of the left and right sides of the vehicle, as shown in FIG. 1A.

Figure 1B:
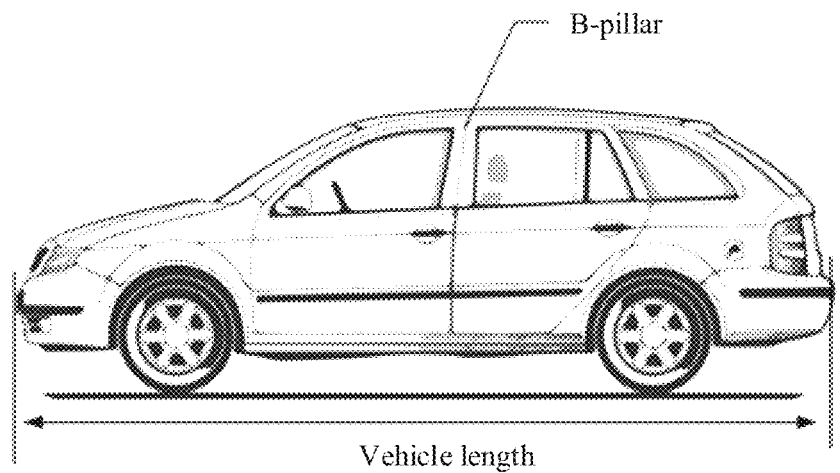
FIG. 1B is a left view of a vehicle according to an embodiment of this application.

FIG. 1B is a left view of the vehicle. A vehicle length in the embodiments of this application is a distance between two extreme points in a length direction of the vehicle, namely a distance between a most protruding position of a front bumper of the vehicle and a most protruding position of a rear bumper of the vehicle.

As shown in FIG. 1B, a B-pillar in the embodiments of this application refers to a vertical bar between front and rear seats of a cockpit, that is, between two doors on both sides, and extends from a roof of the vehicle to the bottom of the vehicle. From an inner side, a safety belt is on the B-pillar. There is a B-pillar on each of the left and right sides of the vehicle.

Figure 2:
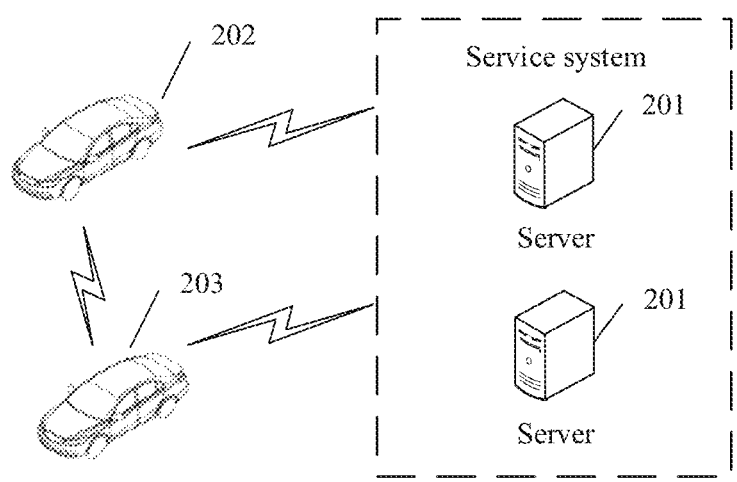
FIG. 2 is a schematic diagram of a vehicle-to-everything system according to an embodiment of this application.

For ease of understanding, the following briefly describes a scenario to which a vehicle warning method provided in the embodiments of this application is applicable. Refer to FIG. 2. FIG. 2 is a schematic diagram of a structure of a system to which the vehicle warning method provided in the embodiments of this application is applicable. The system includes a service system including at least one server 201, and several vehicle-mounted devices corresponding to the service system. In FIG. 2, two vehicle-mounted devices are used as an example. The two vehicle-mounted devices are respectively a first vehicle-mounted device 202 and a second vehicle-mounted device 203.

In the system, the first vehicle-mounted device is disposed in a first vehicle, and the second vehicle-mounted device is disposed in a second vehicle. For ease of description, in this embodiment, a V2X message sent by the first vehicle-mounted device is referred to as a V2X message corresponding to the first vehicle, a V2X message sent by the second vehicle-mounted device is referred to as a V2X message corresponding to the second vehicle. All devices in the system may communicate with each other. Specifically, the devices may communicate with each other through a broadcast message or a unicast message. This is not specifically limited in this application. In an optional manner, a vehicle-mounted device in the system may periodically broadcast a V2X message according to a setting. The V2X message includes position information, direction data, and the like of a vehicle corresponding to the vehicle-mounted device. After another vehicle-mounted device or server in the system receives the V2X message, the vehicle warning method in the embodiments of this application may be used to perform warning recognition.

Figure 3:
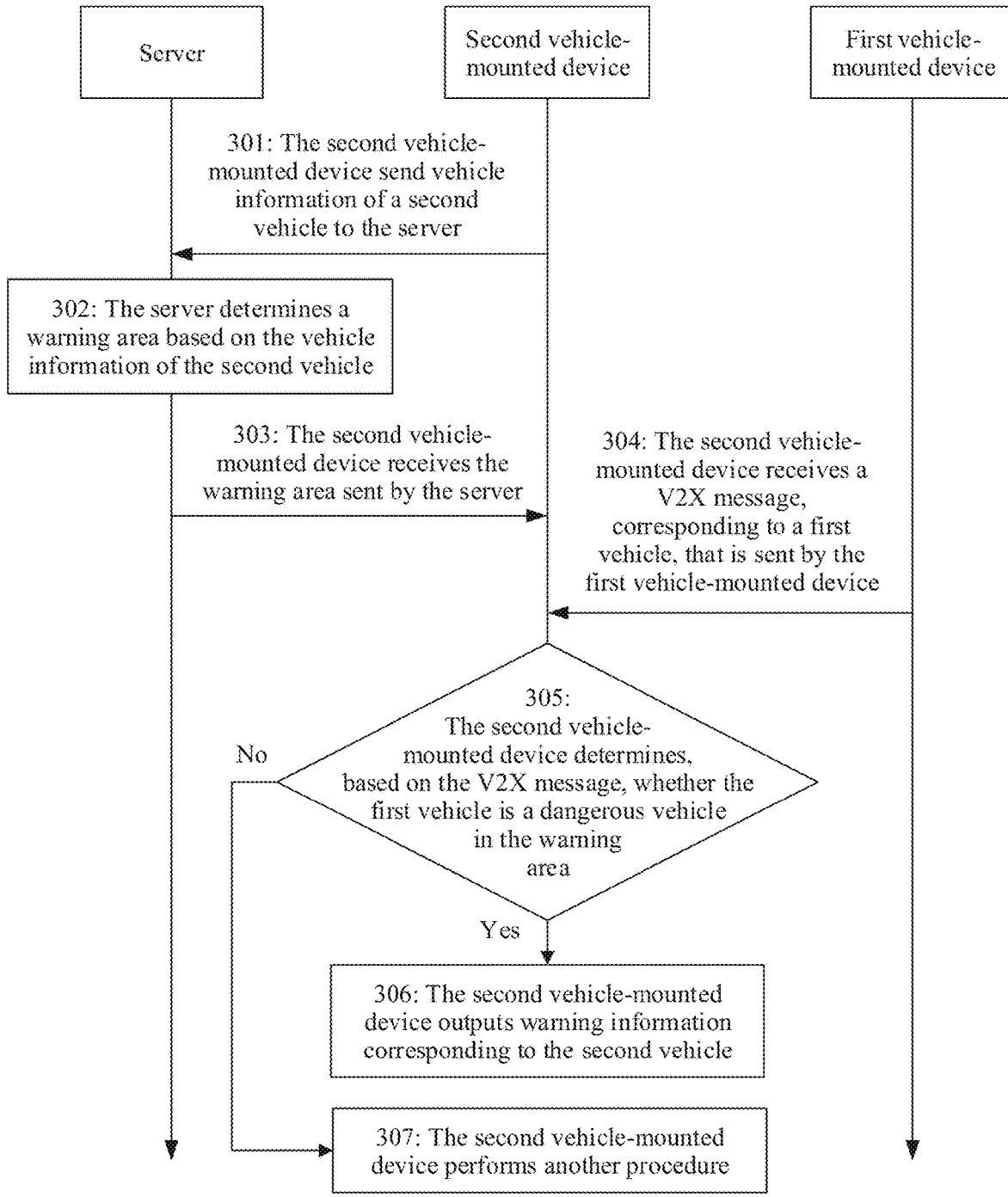
FIG. 3 is a flowchart of an embodiment of a vehicle warning method according to an embodiment of this application.

Based on the foregoing scenario, the following describes in detail the vehicle warning method in the embodiments of this application. Refer to FIG. 3, an embodiment of the vehicle warning method in the embodiments of this application includes the following steps.

301: A second vehicle-mounted device sends vehicle information of a second vehicle to a server.

In this embodiment, the second vehicle-mounted device is an intelligent communications device on the second vehicle. The second vehicle-mounted device pre-stores the vehicle information of the second vehicle. When a predetermined trigger condition is met, the second vehicle-mounted device sends the vehicle information of the second vehicle to the server. Specifically, the trigger condition may be that a user enables a warning function, or the user enables an automatic driving mode, or time meets a preset condition, or another condition. This is not specifically limited herein.

Optionally, in this embodiment, the vehicle information of the second vehicle includes position information of the second vehicle and a vehicle size of the second vehicle.

Optionally, in this embodiment, the position information of the second vehicle may include a GPS measurement result of the second vehicle and at least one of the following: a GPS antenna position of the second vehicle or GPS measurement precision of the second vehicle. The GPS antenna position of the second vehicle is a relative position of an antenna in the second vehicle.

It should be understood that a global positioning system (GPS) measurement result is generally latitude and longitude information obtained through GPS positioning. The latitude and longitude information is essentially used to indicate a longitude and a latitude of a GPS antenna, and there is an error in the longitude and the latitude. A magnitude of the error depends on GPS measurement precision. A position of the GPS antenna in the second vehicle and/or the GPS measurement precision are/is combined, to more accurately position a vehicle position.

302: The server determines a warning area based on the vehicle information of the second vehicle.

After the second vehicle-mounted device sends the vehicle information of the second vehicle, the server receives the vehicle information of the second vehicle, determines a current spatial position of the second vehicle based on the position information of the second vehicle and the vehicle size, and then determines the warning area based on the current spatial position of the second vehicle and the vehicle size.

In an optional manner, vehicle sizes corresponding to different types of vehicles, vehicle sizes corresponding to different vehicle identifiers, or vehicle sizes corresponding to different types of vehicle models are set on a server side. The vehicle information of the second vehicle may include the position information of the second vehicle and at least one of the following: a vehicle type, a vehicle model, or a vehicle identifier of the second vehicle.

After receiving the vehicle information of the second vehicle, the server may determine the vehicle size of the second vehicle based on the vehicle type, the vehicle model, or the vehicle identifier, then determine the current spatial position of the second vehicle based on the vehicle size and the position information of the second vehicle, and then determine, based on the current spatial position of the second vehicle and the vehicle size, the warning area corresponding to the second vehicle.

Optionally, in this embodiment, the warning area includes at least one of the following areas: a left blind spot warning area, a right blind spot warning area, a left lane change warning area, a right lane change warning area, a forward collision warning area, an emergency electronic brake light area, a left do-not-pass warning area, a right do-not-pass warning area, a left intersection movement assist area, and a right intersection movement assist area.

Definitions of different warning areas are different, and manners of determining the warning areas by the server are also different. The following uses examples to describe several cases.

In this embodiment, the warning area includes the left blind spot warning (BSW) area and/or the right blind spot warning area. The vehicle size includes a vehicle length and a vehicle width. The vehicle information further includes a driver seat position. The driver seat position is used to indicate that a driver seat is located on a left side or a right side in the vehicle.

Specifically, if the driver seat is located on the left side in the vehicle, the left blind spot warning area is located behind a left B-pillar of the second vehicle. An area length is positively correlated with the vehicle length, and an area width is positively correlated with the vehicle width. The right blind spot warning area is located behind a right rear view mirror of the second vehicle. An area length is positively correlated with the vehicle length, and an area width is positively correlated with the vehicle width.

If the driver seat is located on the right side in the vehicle, the right blind spot warning area is located behind a right B-pillar of the second vehicle. The area length is positively correlated with the vehicle length, and the area width is positively correlated with the vehicle width. The left blind spot warning area is located behind a left rear view mirror of the second vehicle. The area length is positively correlated with the vehicle length, and the area width is positively correlated with the vehicle width.

Correspondingly, after determining the current spatial position of the second vehicle, the server may determine the left blind spot warning area in the warning area in the following manners: If the driver seat of the second vehicle is located on the left side in the vehicle, a first area on a left rear side of the left B-pillar of the second vehicle is determined as the left blind spot warning area; and/or a second area on a right rear side of the right rear view mirror of the second vehicle is determined as the right blind spot warning area. A length of the first area is a times the vehicle length of the second vehicle. A width of the first area is b times the vehicle width of the second vehicle. A height of the first area is not limited. A length of the second area is c times the vehicle length of the second vehicle. A width of the second area is d times the vehicle width of the second vehicle. A height of the second area is not limited. If the driver seat of the second vehicle is located on the right side in the vehicle, a third area on a right rear side of the right B-pillar of the second vehicle is determined as the right blind spot warning area, and/or a fourth area on a left rear side of the left rear view mirror of the second vehicle is determined as the left blind spot warning area. A length of the third area is a times the vehicle length of the second vehicle. A width of the third area is b times the vehicle width of the second vehicle. A height of the third area is not limited. A length of the fourth area is c times the vehicle length of the second vehicle. A width of the fourth area is d times the vehicle width of the second vehicle. A height of the fourth area is not limited.

Figure 4A:
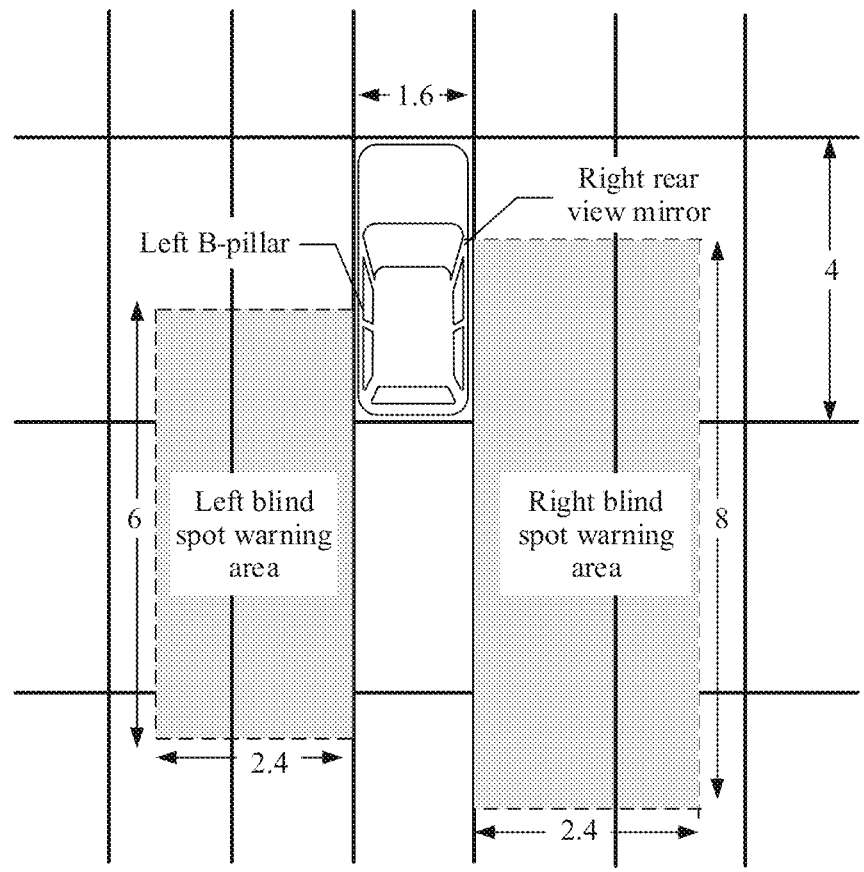
FIG. 4A is a schematic diagram of a warning area according to an embodiment of this application.
Figure 4B:
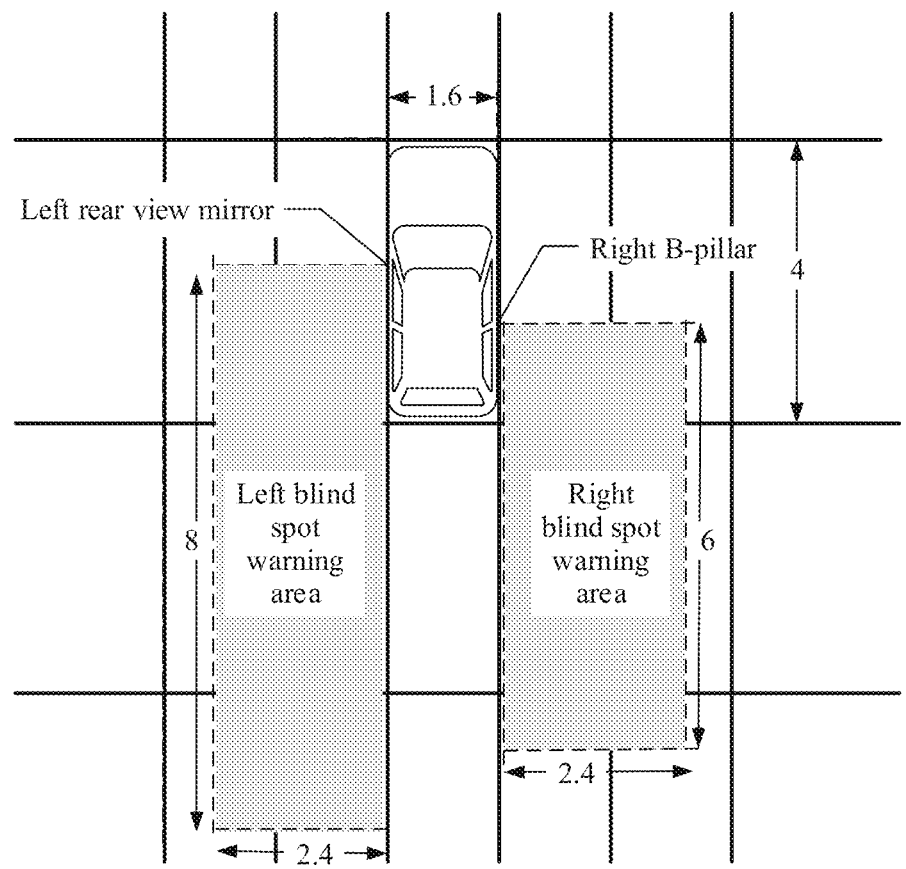
FIG. 4B is a schematic diagram of a warning area according to an embodiment of this application.

It should be understood that a, b, c, and d are preset values. In an example, a=1.5, b=1.5, c=2 and d=1.5 may be set. When the driver seat of the second vehicle is located on the left side in the vehicle, the left blind spot warning area and/or the right blind spot warning area determined by the server are/is shown in FIG. 4A. When the driver seat of the second vehicle is located on the right side in the vehicle, the left blind spot warning area and/or the right blind spot warning area determined by the server are/is shown in FIG. 4B.

In this embodiment, the warning area may include the left lane change warning (LCW) area and/or the right lane change warning area. A definition of the left lane change warning area is similar to that of the left blind spot warning area. A definition of the right blind spot warning area is similar to that of the right blind spot warning area. A manner in which the server determines the left lane change warning area and/or the right lane change warning area is similar to a manner in which the server determines the left blind spot warning area and/or the right blind spot warning area. Details are not described herein again.

In this embodiment, the warning area includes the forward collision warning (FCW) area and an emergency electronic brake light (EEBL) area. The vehicle size includes the vehicle width. The vehicle information further includes a vehicle speed.

The forward collision warning area and the emergency electronic brake light area are located in front of the second vehicle. A width of the forward collision warning area is positively correlated with the vehicle width of the second vehicle. A length of the forward collision warning area is positively correlated with the vehicle speed of the second vehicle. A width of the emergency electronic brake light area is equal to the width of the forward collision warning area. A length of the emergency electronic brake light area is greater than the length of the forward collision warning area. In other words, the emergency electronic brake light area includes the forward collision warning area.

Correspondingly, after determining the current spatial position of the second vehicle, the server may determine the forward collision warning area in the warning area in the following manner: A fifth area in front of the second vehicle is used as the forward collision warning area, and a sixth area in front of the second vehicle is used as the emergency electronic brake light area. Widths of both the fifth area and the sixth area are e times the vehicle width of the second vehicle. A length of the fifth area is the vehicle speed of the second vehicle multiplied by f seconds. A length of the sixth area is g times the length of the fifth area. Heights of both the fifth area and the sixth area are not limited.

Figure 4C:
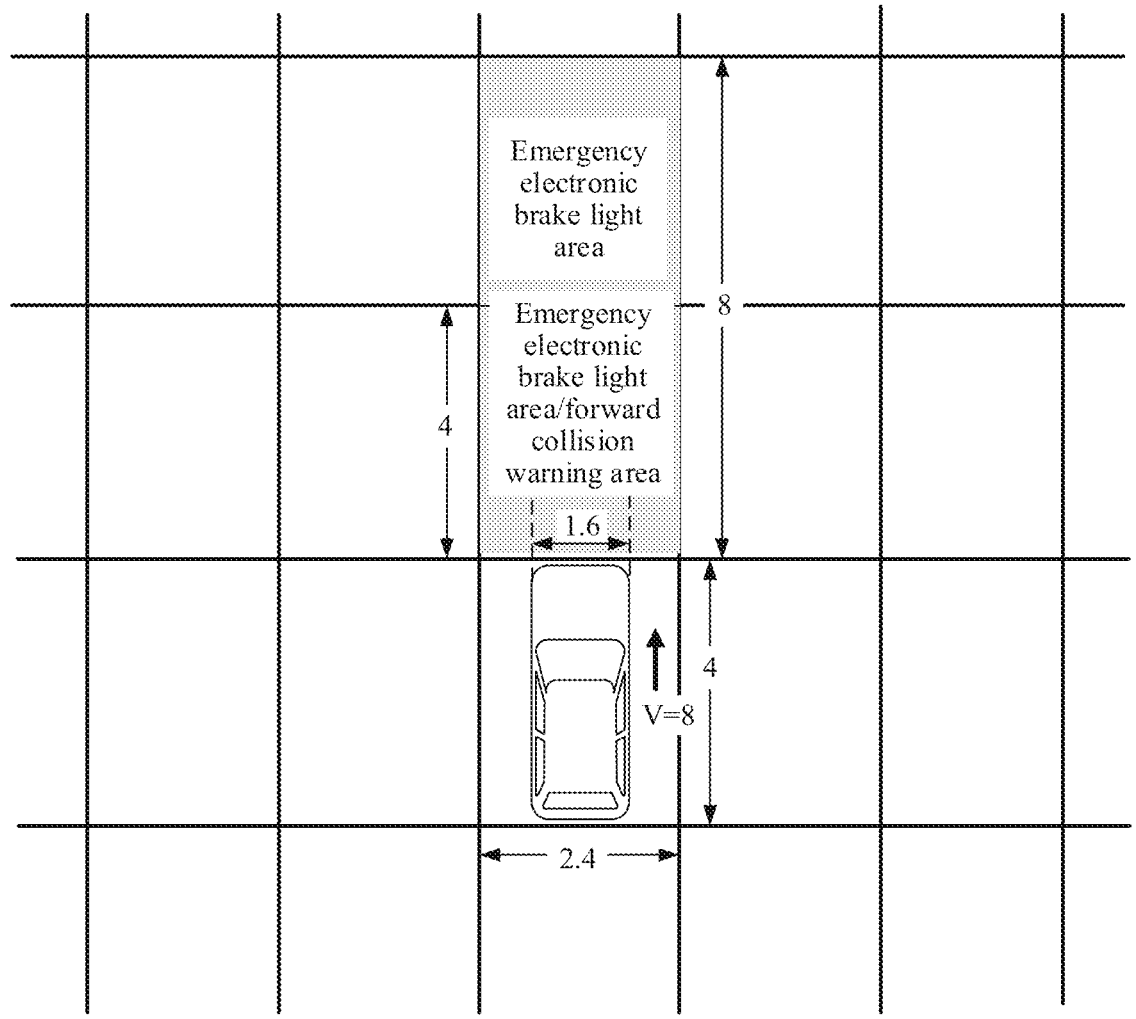
FIG. 4C is a schematic diagram of a warning area according to an embodiment of this application.

It should be understood that e, f, and g are preset values. In an example, e=1.5, f=0.5, and g=2 may be set. When the vehicle speed of the second vehicle is 8 meters/second, the forward collision warning area and the emergency electronic brake light area that are determined by the server are shown in FIG. 4C.

In this embodiment, the warning area includes a left do-not-pass warning (DNPW) area and/or a right do-not-pass warning area. The vehicle size includes the vehicle width and the vehicle length.

The left do-not-pass warning area is located in left front of a left side of a head of the second vehicle. A length of the left do-not-pass warning area is positively correlated with the vehicle length of the second vehicle. A width of the left do-not-pass warning area is positively correlated with the vehicle width of the second vehicle. In addition, the length of the left do-not-pass warning area is greater than the width of the left do-not-pass warning area. The right do-not-pass warning area is located in right front of a right side of the head of the second vehicle. A length of the right do-not-pass warning area is positively correlated with the vehicle length of the second vehicle. A width of the right do-not-pass warning area is positively correlated with the vehicle width of the second vehicle. In addition, the length of the right do-not-pass warning area is greater than the width of the right do-not-pass warning area.

Correspondingly, after determining the current spatial position of the second vehicle, the server may determine the left do-not-pass warning area and/or the right do-not-pass warning area in the warning area in the following manner: A seventh area in left front of the left side of the head of the second vehicle is used as the left do-not-pass warning area. An eighth area in right front of the right side of the head of the second vehicle is used as the right do-not-pass warning area. A width of the seventh area is h times the vehicle width of the second vehicle. A length of the seventh area is i times the vehicle length of the second vehicle. A height of the seventh area is not limited. A width of the eighth area is j times the vehicle width of the second vehicle. A length of the eighth area is k times the vehicle length of the second vehicle. A height of the eighth area is not limited.

Figure 4D:
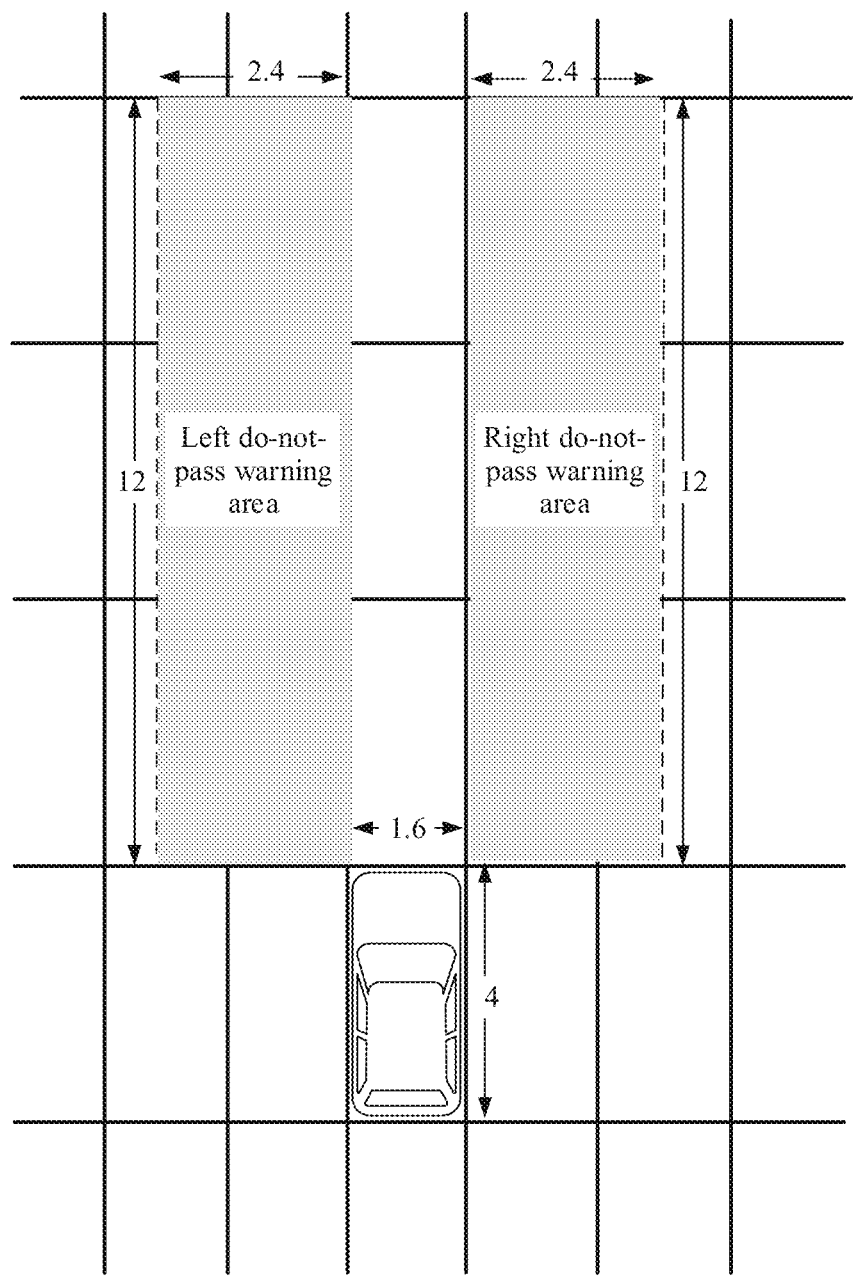
FIG. 4D is a schematic diagram of a warning area according to an embodiment of this application.

It should be understood that h, i, j, and k are preset values. In an example, h=1.5, i=3, j=1.5, and k=3 may be set. In this case, the left do-not-pass warning area and/or the right do-not-pass warning area that are/is of the second vehicle and that are/is determined by the server are/is shown in FIG. 4D.

In this embodiment, the warning area may include the left intersection movement assist (IMA) area and/or the right intersection movement assist area. The vehicle size includes the vehicle width and the vehicle length.

Specifically, the left intersection movement assist area is located in left front of the left side of the head of the second vehicle. A length of the left intersection movement assist area is positively correlated with the vehicle length of the second vehicle. A width of the left intersection movement assist area is positively correlated with the vehicle width of the second vehicle. The right intersection movement assist area is located in right front of the right side of the head of the second vehicle. A length of the right intersection movement assist area is positively correlated with the vehicle length of the second vehicle. A width of the right intersection movement assist area is positively correlated with the vehicle width of the second vehicle.

Correspondingly, after determining the current spatial position of the second vehicle, the server may determine the left intersection movement assist area and/or the right intersection movement assist area in the warning area in the following manner: A ninth area in left front of the left side of the head of the second vehicle is used as the left intersection movement assist area. A tenth area in right front of the right side of the head of the second vehicle is used as the right intersection movement assist area. A width of the ninth area is m times the vehicle width of the second vehicle. A length of the ninth area is n times the vehicle length of the second vehicle. A height of the ninth area is not limited. A width of the tenth area is p times the vehicle width of the second vehicle. A length of the tenth area is q times the vehicle length of the second vehicle. A height of the tenth area is not limited.

Figure 4E:
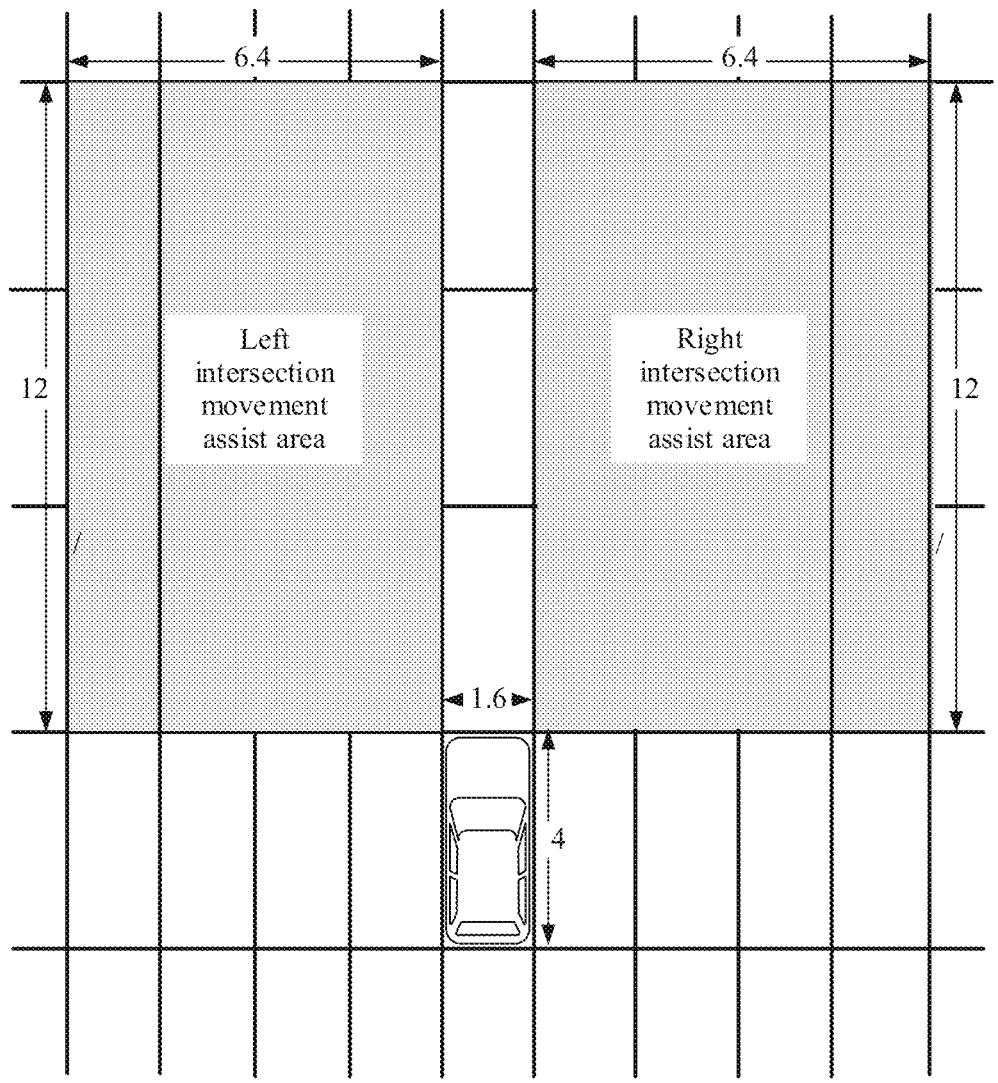
FIG. 4E is a schematic diagram of a warning area according to an embodiment of this application.

It should be understood that m, n, p, and q are preset values. In an example, m=4, n=3, p=4, and q=3 may be set. In this case, the left intersection movement assist area and/or the right intersection movement assist area that are/is of the second vehicle and that are/is determined by the server are/is shown in FIG. 4E.

303: The second vehicle-mounted device receives the warning area sent by the server.

After determining the warning area based on the vehicle information of the second vehicle, the server sends the warning area to the second vehicle-mounted device, and the second vehicle-mounted device receives the warning area sent by the server. It should be understood that, in this embodiment, sending the warning area refers to sending information that indicate a position corresponding to the warning area, for example, sending a longitude and latitude range of the area.

304: The second vehicle-mounted device receives a V2X message, corresponding to a first vehicle, that is sent by a first vehicle-mounted device.

The first vehicle-mounted device periodically or aperiodically sends, according to a setting, the V2X message corresponding to the first vehicle. The second vehicle-mounted device receives the V2X message corresponding to the first vehicle. The V2X message includes at least one of the following: position information of the first vehicle, an orientation of the first vehicle, a brake light status of the first vehicle, a turn light status of the first vehicle, and a speed of the first vehicle. It should be understood that the V2X message may further include other information. This is not specifically limited in this application.

It should be noted that the position information of the first vehicle may include a GPS measurement result of the first vehicle and at least one of the following: a GPS antenna position of the first vehicle or GPS measurement precision of the first vehicle. The GPS antenna position of the first vehicle is a relative position of an antenna in the first vehicle. The brake light status of the first vehicle is used to indicate whether a brake light of the first vehicle is turned on. The turn light status of the first vehicle is used to indicate whether turn lights (including a left-turn light and a right-turn light) of the first vehicle are turned on. The speed of the first vehicle is a current speed of the first vehicle, and the speed may dynamically change.

305: The second vehicle-mounted device determines, based on the V2X message, whether the first vehicle is a dangerous vehicle in the warning area; if yes, step 306 is performed; and if no, step 307 is performed.

After determining the warning area of the second vehicle and receiving the V2X message corresponding to the first vehicle, the second vehicle-mounted device determines, based on the V2X message, whether the first vehicle is a dangerous vehicle in the warning area. If yes, step 306 is performed. If no, step 307 is performed.

In this embodiment, the warning area includes one or more of the following areas: the left blind spot warning area, the right blind spot warning area, the left lane change warning area, the right lane change warning area, the forward collision warning area, the pre-emergency electronic brake light, the left do-not-pass warning area, the right do-not-pass warning area, the left intersection movement assist area, and the right intersection movement assist area.

The second vehicle-mounted device first determines a current spatial position of the first vehicle based on the position information in the V2X message. If the current spatial position of the first vehicle is in one of the warning areas, the second vehicle-mounted device determines, based on a warning condition of the area, whether the first vehicle is a dangerous vehicle in the area. It should be understood that warning conditions of some areas may be set as follows:

As long as a vehicle is located in the area, it is considered that the vehicle meets the warning condition. It should be further understood that a vehicle being in an area may be specifically that a part of the vehicle enters the area, or the entire vehicle enters the area. This is not specifically limited in this application.

Optionally, different warning conditions may be set for different warning areas. The warning condition may include at least one of the following: a speed condition, a turn light condition, a brake light condition, and a vehicle orientation condition. When the first vehicle meets one or more warning conditions, the second vehicle-mounted device determines that the first vehicle is a dangerous vehicle in a warning area corresponding to the warning conditions.

Specifically, if the current spatial position of the first vehicle is in the left blind spot warning area or the right blind spot warning area, it is determined whether the orientation of the first vehicle is the same as an orientation of the second vehicle. If the orientations are the same, it is determined that the first vehicle is a dangerous vehicle in the left blind area warning area or the right blind area warning area.

If the current spatial position of the first vehicle is in the left lane change warning area, it is determined whether the orientation of the first vehicle is the same as the orientation of the second vehicle, and whether a right-turn light of the second vehicle is turned on. If the orientation of the second vehicle is the same as the orientation of the first vehicle, and the right-turn light of the second vehicle is turned on, it is determined that the second vehicle is a dangerous vehicle in the left lane change warning area. If the current spatial position of the first vehicle is in the right lane change warning area, it is determined whether the orientation of the second vehicle is the same as the orientation of the first vehicle, and whether a left-turn light of the second vehicle is turned on. If the orientation of the second vehicle is the same as the orientation of the first vehicle, and the left-turn light of the second vehicle is turned on, it is determined that the second vehicle is a dangerous vehicle in the right lane change warning area.

If the current spatial position of the first vehicle is in the forward collision warning area, the second vehicle-mounted device may determine that the first vehicle is a dangerous vehicle in the forward collision warning area.

If the current spatial position of the first vehicle is in the emergency electronic brake light area, it is determined whether the brake light of the first vehicle is turned on. If the brake light of the first vehicle is turned on, the second vehicle-mounted device determines that the first vehicle is a dangerous vehicle in the emergency electronic brake light area.

If the current spatial position of the first vehicle is in the left do-not-pass warning area or the right do-not-pass warning area, it is determined whether the speed of the first vehicle is zero and whether the orientation of the first vehicle is opposite to the orientation of the second vehicle. If the speed of the first vehicle is not zero, and the orientation of the first vehicle is opposite to the orientation of the second vehicle, it is determined that the first vehicle is a dangerous vehicle in the left overtaking warning area or the right overtaking warning area.

If the current spatial position of the first vehicle is in the left intersection movement assist area or the right intersection movement assist area, it is determined whether the speed of the first vehicle is zero and whether the orientation of the first vehicle intersects the orientation of the second vehicle. If the speed of the first vehicle is not zero, and the orientation of the first vehicle intersects the orientation of the second vehicle, it is determined that the first vehicle is a dangerous vehicle in the left intersection movement assist area or the right intersection movement assist area.

It should be noted that the foregoing orientation of the vehicle refers to a direction in which the vehicle is located. In an optional manner, a geographical direction may be used for identification. For example, orientations may be roughly divided into several directions such as east, south, west, north, northwest, southwest, northeast, and southeast. The orientation of the vehicle is roughly indicated by these directions. Alternatively, the orientation of the vehicle may be accurately indicated in a manner in which a direction A deviates from a direction B by X degrees, or the orientation of the vehicle may be indicated in another manner. This is not specifically limited in this application. However, in this embodiment, that orientations of two vehicles are the same may be specifically that the two vehicles roughly face a same direction. For example, if both a vehicle A and a vehicle B face east, it is determined that orientations of the vehicle A and the vehicle B are the same. That orientations of two vehicles are opposite specifically means that the orientations of the two vehicles are roughly opposite. For example, if the vehicle A faces east and a vehicle C faces west, it is determined that orientations of the vehicle A and the vehicle C are opposite.

It should be further noted that the foregoing several manners are merely examples. In actual application, based on setting of different warning conditions, the second vehicle-mounted device may further determine, in another manner, whether the first vehicle is a dangerous vehicle in the warning area. This is not specifically limited herein.

306: The second vehicle-mounted device outputs warning information corresponding to the second vehicle.

When the second vehicle-mounted device determines that the first vehicle is a dangerous vehicle, the second vehicle-mounted device outputs the warning information corresponding to the second vehicle.

In an optional manner, the second vehicle-mounted device may display the warning information on a dashboard of the second vehicle. The warning information is used to indicate to the user that there is a dangerous vehicle in the warning area. Further, the warning information is also used to indicate, to the user, a specific warning area in which there is a dangerous vehicle. For example, if the second vehicle-mounted device determines that the first vehicle is a dangerous vehicle in the forward collision warning area, the second vehicle-mounted device may indicate, to the user on the dashboard in a form of a text or a graph, that there is a dangerous vehicle in the forward collision warning area.

In an optional manner, the second vehicle-mounted device may alternatively output the warning information in a voice manner, to prompt the user that there is a dangerous vehicle in the warning area. Further, the warning information is also used to indicate, to the user, the specific warning area in which there is a dangerous vehicle. For example, if the second vehicle-mounted device determines that the first vehicle is a dangerous vehicle in the right intersection movement assist area, the second vehicle-mounted device may play, through a microphone of the second vehicle, a voice prompt "there is a dangerous vehicle in the right intersection movement assist area".

In an optional manner, when displaying the warning information on the dashboard, the second vehicle-mounted device may prompt, to the user through a voice, that there is a danger in the warning area.

It should be understood that, in addition to the foregoing several manners, the second vehicle-mounted device may alternatively prompt, in another manner, the user that there is a dangerous vehicle in the warning area. This is not specifically limited herein.

307: The second vehicle-mounted device performs another procedure.

When the second vehicle-mounted device determines that the first vehicle is not a dangerous vehicle in the warning area, the second vehicle-mounted device may prompt the user that there is no dangerous vehicle in a current warning area, or continue to determine another vehicle, or perform another procedure. This is not specifically limited in this application.

It should be noted that, in this embodiment, there is no sequence between step 303 and step 304. The second vehicle-mounted device may first receive the warning area, and then receive the V2X message, or may first receive the V2X message, and then receive the warning area. The two steps may alternatively be performed simultaneously. This is not specifically limited in this application.

It should be noted that, in some embodiments, the warning area may be determined by the second vehicle-mounted device. To be specific, the second vehicle-mounted device may not perform the step of sending the vehicle information to the server and the step of receiving the warning area sent by the server. In other words, step 301 and step 303 are not performed. The server also does not perform the step of determining the warning area based on the vehicle information. In other words, step 302 in not performed. Instead, the second vehicle-mounted device determines the warning area based on pre-stored vehicle information of the second vehicle, receives the V2X message that is sent by the first vehicle-mounted device and that corresponds to the first vehicle, and then determines, based on the V2X message, whether the first vehicle is a dangerous vehicle in the warning area. A manner in which the second vehicle-mounted device determines the warning area based on the vehicle information of the second vehicle is similar to the manner in which the server determines the warning area in step 302. Details are not described herein again.

In this embodiment of this application, after receiving the V2X message corresponding to the first vehicle, the second vehicle-mounted device determines, based on the V2X message, whether the first vehicle is a dangerous vehicle in the warning area. If yes, the warning information corresponding to the second vehicle is outputted. The warning area corresponds to the vehicle information of the second vehicle. The vehicle information includes first position information and the vehicle size. In this embodiment, the warning area of the vehicle is set based on a position and a size of the vehicle. When there is a vehicle in the warning area, and the vehicle meets a warning condition of the warning area, an alarm is triggered. In other words, in this embodiment, a dangerous vehicle having a collision risk may be obtained through analysis without depending on a map. This is easy to implement, and may also avoid misjudgment caused by factors such as map precision and lane infringement of the vehicle, thereby improving recognition accuracy.

In addition, this embodiment provides a plurality of manners for determining the warning area and a plurality of manners for outputting the warning information, thereby improving flexibility of the solution.

It should be understood that in the vehicle warning method corresponding to FIG. 3, the second vehicle-mounted device performs warning recognition. In some embodiments, the server may alternatively perform warning recognition. The following describes in detail. Refer to FIG.

5. An embodiment of the vehicle warning method in the embodiments of this application includes the following steps.

501: A second vehicle-mounted device determines a warning area based on vehicle information of a second vehicle.

In this embodiment, the second vehicle-mounted device is an intelligent communications device on the second vehicle. The second vehicle-mounted device pre-stores the vehicle information of the second vehicle. When a predetermined trigger condition is met, the second vehicle-mounted device determines the warning area based on the pre-stored vehicle information of the second vehicle.

Specifically, the trigger condition may be that a user enables a warning function, or the user enables an automatic driving mode, or time meets a preset condition, or another condition. This is not specifically limited herein.

Optionally, in this embodiment, the vehicle information of the second vehicle includes position information of the second vehicle and a vehicle size of the second vehicle. In this case, the second vehicle-mounted device may determine the warning area in the following manner: A current spatial position of the second vehicle is determined based on the position information of the second vehicle. Then, the warning area corresponding to the second vehicle is determined based on the current spatial position and the vehicle size of the second vehicle.

Optionally, in this embodiment, the vehicle information of the second vehicle includes the position information of the second vehicle and at least one of the following: a vehicle type, a vehicle model, or a vehicle identifier of the second vehicle. Vehicle sizes corresponding to different types of vehicles, vehicle sizes corresponding to different vehicle identifiers, or vehicle sizes corresponding to different types of vehicle models are set on a server side. In this case, the second vehicle-mounted device may determine the warning area in the following manner: The current spatial position of the second vehicle is determined based on the position information of the second vehicle, and a vehicle size corresponding to the vehicle type, the vehicle model, or the vehicle identifier is obtained from the server side. The warning area corresponding to the second vehicle is determined based on the current spatial position and the vehicle size.

It should be noted that the vehicle information of the second vehicle may further include other information, such as a vehicle speed and a vehicle orientation. The vehicle size of the second vehicle includes at least one of the following: a vehicle width and a vehicle length.

It should be noted that, in this embodiment, the position information of the second vehicle may include a GPS measurement result of the second vehicle and at least one of the following: a GPS antenna position of the second vehicle or GPS measurement precision of the second vehicle. The GPS antenna position of the second vehicle is a relative position of an antenna in the second vehicle.

It should be further noted that a GPS measurement result is generally latitude and longitude information obtained through GPS positioning. The latitude and longitude information is essentially used to indicate a longitude and a latitude of a GPS antenna, and there is an error in the longitude and the latitude. A magnitude of the error depends on GPS measurement precision. A position of the GPS antenna in the second vehicle and/or the GPS measurement precision are/is combined, to more accurately position a vehicle position.

The warning area determined in the foregoing two implementations may include at least one of the following areas: a left blind spot warning area, a right blind spot warning area, a left lane change warning area, a right lane change warning area, a forward collision warning area, a pre-emergency electronic brake light, a left do-not-pass warning area, a right do-not-pass warning area, a left intersection movement assist area, and a right intersection movement assist area.

If a driver seat is located on a left side in the vehicle, the left blind spot warning area is located behind a left B-pillar of the second vehicle. An area length is positively correlated with the vehicle length, and an area width is positively correlated with the vehicle width. The right blind spot warning area is located behind a right rear view mirror of the second vehicle. An area length is positively correlated with the vehicle length, and an area width is positively correlated with the vehicle width.

If the driver seat is located on the right side in the vehicle, the right blind spot warning area is located behind a right B-pillar of the second vehicle. The area length is positively correlated with the vehicle length, and the area width is positively correlated with the vehicle width. The left blind spot warning area is located behind a left rear view mirror of the second vehicle. The area length is positively correlated with the vehicle length, and the area width is positively correlated with the vehicle width.

A definition of the left lane change warning area is similar to that of the left blind spot warning area. A definition of the right blind spot warning area is similar to that of the right blind spot warning area. A manner in which a server determines the left lane change warning area and/or the right lane change warning area is similar to a manner in which the server determines the left blind spot warning area and/or the right blind spot warning area. Details are not described herein again.

The forward collision warning area is located in front of the second vehicle. A width of the forward collision warning area is positively correlated with the vehicle width of the second vehicle. A length of the forward collision warning area is positively correlated with a vehicle speed of the second vehicle.

The emergency electronic brake light area is located in front of the second vehicle. A width of the emergency electronic brake light area is positively correlated to the vehicle width of the second vehicle. A length of the emergency electronic brake light area is positively correlated to the vehicle speed of the second vehicle. Specifically, the width of the emergency electronic brake light area is equal to the width of the forward collision warning area, and the length of the emergency electronic brake light area is greater than the length of the forward collision warning area.

The left intersection movement assist area is located in left front of a left side of a head of the second vehicle. A length of the left intersection movement assist area is positively correlated with the vehicle length of the second vehicle. A width of the left intersection movement assist area is positively correlated with the vehicle width of the second vehicle. The right intersection movement assist area is located in right front of a right side of the head of the second vehicle. A length of the right intersection movement assist area is positively correlated with the vehicle length of the second vehicle. A width of the right intersection movement assist area is positively correlated with the vehicle width of the second vehicle.

The second vehicle-mounted device may determine a corresponding warning area based on corresponding vehicle information. For a specific process, refer to the manner in which the server determines the warning area in the embodiment in FIG. 3. Details are not described herein again.

502: The second vehicle-mounted device sends the warning area to the server.

After determining the warning area based on the vehicle information of the second vehicle, the second vehicle-mounted device sends the warning area to the server, and the server receives the warning area. It should be understood that, in this embodiment, sending the warning area refers to sending information that indicate a position corresponding to the warning area, for example, sending a longitude and latitude range of the area.

503: The server receives a V2X message, corresponding to a first vehicle, that is sent by a first vehicle-mounted device.

The first vehicle-mounted device periodically or aperiodically sends, according to a setting, the V2X message corresponding to the first vehicle. The server receives the V2X message corresponding to the first vehicle. The V2X message includes at least one of the following: position information of the first vehicle, an orientation of the first vehicle, a brake light status of the first vehicle, a turn light status of the first vehicle, and a speed of the first vehicle. It should be understood that the V2X message may further include other information. This is not specifically limited in this application.

It should be noted that the position information of the first vehicle may include a GPS measurement result of the first vehicle and at least one of the following: a GPS antenna position of the first vehicle or GPS measurement precision of the first vehicle. The GPS antenna position of the first vehicle is a relative position of an antenna in the first vehicle. The brake light status of the first vehicle is used to indicate whether a brake light of the first vehicle is turned on. The turn light status of the first vehicle is used to indicate whether turn lights (including a left-turn light and a right-turn light) of the first vehicle are turned on. The speed of the first vehicle is a current speed of the first vehicle, and the speed may dynamically change.

504: The server determines, based on the V2X message, whether the first vehicle is a dangerous vehicle in the warning area; if yes, step 505 is performed; and if no, step 507 is performed.

After obtaining the warning area and the V2X message corresponding to the first vehicle, the server determines, based on the V2X message, whether the first vehicle is a dangerous vehicle in the warning area. If yes, step 505 is performed. If no, step 507 is performed.

Specifically, the server first determines a current spatial position of the first vehicle based on the position information in the V2X message. If the current spatial position of the first vehicle is in one of the warning areas, the second vehicle-mounted device determines, based on a warning condition of the area, whether the first vehicle is a dangerous vehicle in the area. Different warning conditions may be set for different warning areas. The warning condition may include at least one of the following: a speed condition, a turn light condition, a brake light condition, and a vehicle orientation condition. When the first vehicle meets one or more warning conditions, the second vehicle-mounted device determines that the first vehicle is a dangerous vehicle in a warning area corresponding to the warning conditions. A specific determining process is similar to the determining process by the second vehicle-mounted device in the embodiment corresponding to FIG. 3. Details are not described herein again.

505: The server sends information to the second vehicle-mounted device, and performs step 506.

When the server determines that the first vehicle is a dangerous vehicle in the warning area of the second vehicle, the server sends notification information to the second vehicle-mounted device, to notify the second vehicle-mounted device that there is a dangerous vehicle in the warning area of the second vehicle.

506: The second vehicle-mounted device prompts the user that there is a dangerous vehicle in the warning area.

After receiving the notification information sent by the server, the second vehicle-mounted device outputs corresponding warning information to prompt the user that there is a dangerous vehicle in the warning area. Specifically, the second vehicle-mounted device may display the warning information on a dashboard of the second vehicle, or output the warning information in a voice manner, or output the warning information in another manner. This is not specifically limited in this application. In an optional manner, the server may notify, in the notification information, the second vehicle-mounted device of a specific area in which there is a dangerous vehicle. In this case, the warning information output by the second vehicle-mounted device may further indicate, to the user, the specific area in which there is a dangerous vehicle.

507: The server performs another procedure.

When the server determines that the first vehicle is not a dangerous vehicle in the warning area, the server indicates, to the second vehicle-mounted device, that currently there is no dangerous vehicle in the warning area, or continues to determine another vehicle, or performs another procedure. This is not specifically limited in this application.

It should be noted that, in this embodiment, there is no sequence between steps of receiving the warning area and receiving the V2X message by the server. The server may first receive the warning area and then receive the V2X message, or may first receive the V2X message and then receive the warning area. The two steps may alternatively be performed simultaneously. This is not specifically limited in this application.

It should be noted that, in some embodiments, the warning area may be determined by the server. To be specific, the second vehicle-mounted device may not perform the steps of determining the warning area based on the vehicle information of the second vehicle and sending the warning area to the server. In other words, step 501 and step 502 are not performed, and the server does not perform the step of receiving the warning area. Instead, the second vehicle-mounted device sends the vehicle information of the second vehicle to the server. The server determines the warning area of the second vehicle based on the vehicle information sent by the second vehicle-mounted device, receives the V2X message that is sent by the first vehicle-mounted device and that corresponds to the first vehicle, and then determines, based on the V2X message, whether the first vehicle is a dangerous vehicle in the warning area. A manner in which the server determines the warning area based on the vehicle information of the second vehicle is similar to the manner in which the second vehicle-mounted device determines the warning area in step 501. Details are not described herein again.

In this embodiment of this application, after receiving the V2X message corresponding to the first vehicle, the server determines, based on the V2X message, whether the first vehicle is a dangerous vehicle in the warning area. If yes, the warning information corresponding to the second vehicle is output. The warning area corresponds to the vehicle information of the second vehicle. The vehicle information includes first position information and the vehicle size. In this embodiment, the warning area of the vehicle is set based on a position and a size of the vehicle. When there is a vehicle in the warning area, and the vehicle meets a warning condition of the warning area, an alarm is triggered. In other words, in this embodiment, a dangerous vehicle having a collision risk may be obtained through analysis without depending on a map. This is easy to implement, and may also avoid misjudgment caused by factors such as map precision and lane infringement of the vehicle, thereby improving recognition accuracy.

In addition, this embodiment provides a plurality of manners of determining the warning area by the server, thereby improving flexibility of the solution.

For ease of understanding, the following describes in detail the warning method in the embodiments of this application by using a specific application scenario.

Vehicle-mounted devices of vehicles A, B, C, and D each broadcast a GPS measurement result, a GPS antenna position, a vehicle speed, a vehicle orientation, a brake light status, and a turn light status of the corresponding vehicle in 10 millisecond increments according to a setting.

Figure 6:
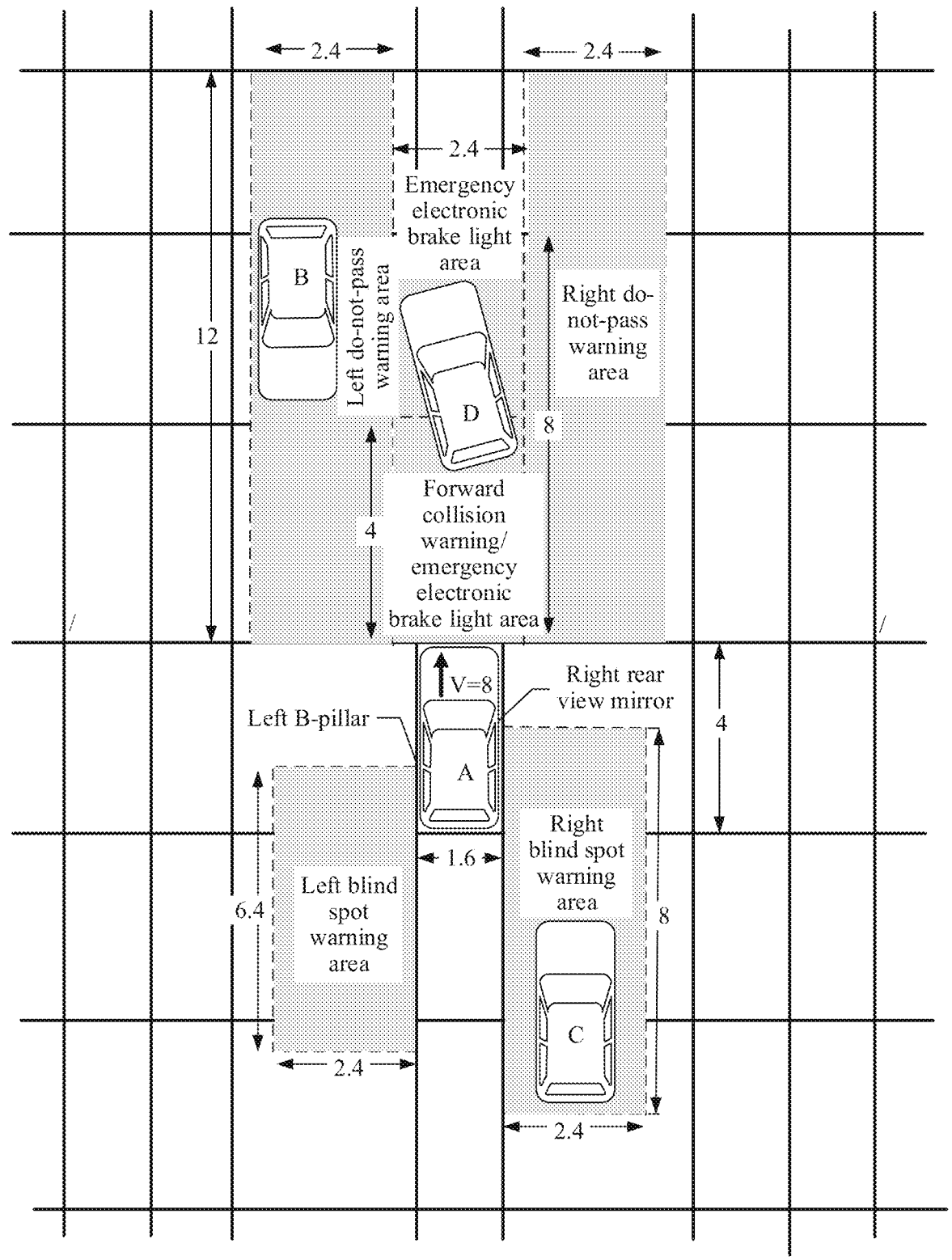
FIG. 6 is a flowchart of an embodiment of a dangerous vehicle according to an embodiment of this application.

A driver position of the vehicle A is located on a left side in the vehicle. A length of the vehicle is 4 meters, and a width of the vehicle is 1.6 meters. At a moment, the vehicle-mounted device (a second vehicle-mounted device) of the vehicle A obtains a vehicle speed (8 meters/second), an orientation (north), a GPS measurement result, and a GPS antenna position of the vehicle A, and obtains a current spatial position of the vehicle A based on the GPS measurement result and the GPS antenna position. Then, a left blind spot warning area, a right blind spot warning area, a left do-not-pass warning area, a right do-not-pass warning area, a forward collision warning area, and an emergency electronic brake light area of the vehicle A are determined based on the current space position, the vehicle length, the vehicle width, and the vehicle speed of the vehicle A, As shown in FIG. 6, the left blind spot warning area is located 1.5 vehicle lengths backward and 1.5 vehicle widths outward from a left B-pillar. The right blind spot warning area is located 2 vehicle lengths backward and 1.5 vehicle widths outward from a right rear view mirror. The left do-not-pass warning area is located 1.5 vehicle widths outward and 3 vehicle lengths forward from a left side of a head of the vehicle A. The right do-not-pass warning area is located on 1.5 vehicle widths outward and 3 vehicle lengths forward from a right side of the head of the vehicle A. The forward collision warning area is located in front of the vehicle A. A width is equal to 1.5 vehicle widths, and a length is equal to the vehicle speed multiplied by 0.5 seconds. The emergency electronic brake light area is located in front of the vehicle A. A width is equal to 1.5 vehicle widths, and a length is equal to the vehicle speed multiplied by 1 second.

In addition, the vehicle-mounted device of the vehicle A further receives V2X messages sent by the vehicle-mounted devices (first vehicle-mounted devices) of the vehicles B, C, and D. The vehicle-mounted device of the vehicle A determines a current spatial position of the vehicle B based on a GPS measurement result and a GPS antenna position in a V2X message sent by the vehicle-mounted device of the vehicle B. A current spatial position of the vehicle C is determined based on a GPS measurement result and a GPS antenna position in a V2X message sent by the vehicle-mounted device of the vehicle C. A current spatial position of the vehicle D is determined based on a GPS measurement result and a GPS antenna position in a V2X message sent by the vehicle-mounted device of the vehicle D. The vehicle B is located in the left do-not-pass warning area of the vehicle A. The vehicle C is located in the right blind spot warning area of the vehicle A. The vehicle D is located in the emergency electronic brake light area of the vehicle A.

The vehicle-mounted device of the vehicle A determines whether a vehicle orientation of the vehicle B is opposite to a vehicle orientation of the vehicle A. A vehicle orientation in the V2X message sent by the vehicle-mounted device of the vehicle B is south. In other words, the vehicle orientation of the vehicle B is opposite to the vehicle orientation of the vehicle A. The vehicle B meets a warning condition of the left do-not-pass warning area. Therefore, the vehicle B is determined as a dangerous vehicle in the left do-not-pass warning area of the vehicle A.

The vehicle-mounted device of the vehicle A determines whether a vehicle orientation of the vehicle C is the same as the vehicle orientation of the vehicle A. A vehicle orientation in the V2X message sent by the vehicle-mounted device of the vehicle C is north. In other words, the vehicle orientation of the vehicle C is the same as the vehicle orientation of the vehicle A. The vehicle C meets a warning condition of the right blind spot warning area. Therefore, the vehicle C is determined as a dangerous vehicle in the right blind spot warning area of the vehicle A.

The vehicle-mounted device of the vehicle A determines whether a vehicle orientation of the vehicle D is the same as the vehicle orientation of the vehicle A. A vehicle orientation in the V2X message sent by the vehicle-mounted device of the vehicle D is north. In other words, the vehicle orientation of the vehicle D is the same as the vehicle orientation of the vehicle A. Further, the vehicle-mounted device of the vehicle A determines whether an emergency electronic brake light of the vehicle D is turned on. A brake light status in the V2X message sent by the vehicle-mounted device of the vehicle D is on. In this case, the vehicle D meets a warning condition of the emergency electronic brake light area. Therefore, the vehicle D is determined as a dangerous vehicle in the emergency electronic brake light area of the vehicle A.

The vehicle-mounted device of the vehicle A prompts, on a dashboard of the vehicle A through a graphic identifier, a user that there are dangerous vehicles in the left do-not-pass warning area, the right blind spot warning area, and the emergency electronic brake light area.

Figure 7:
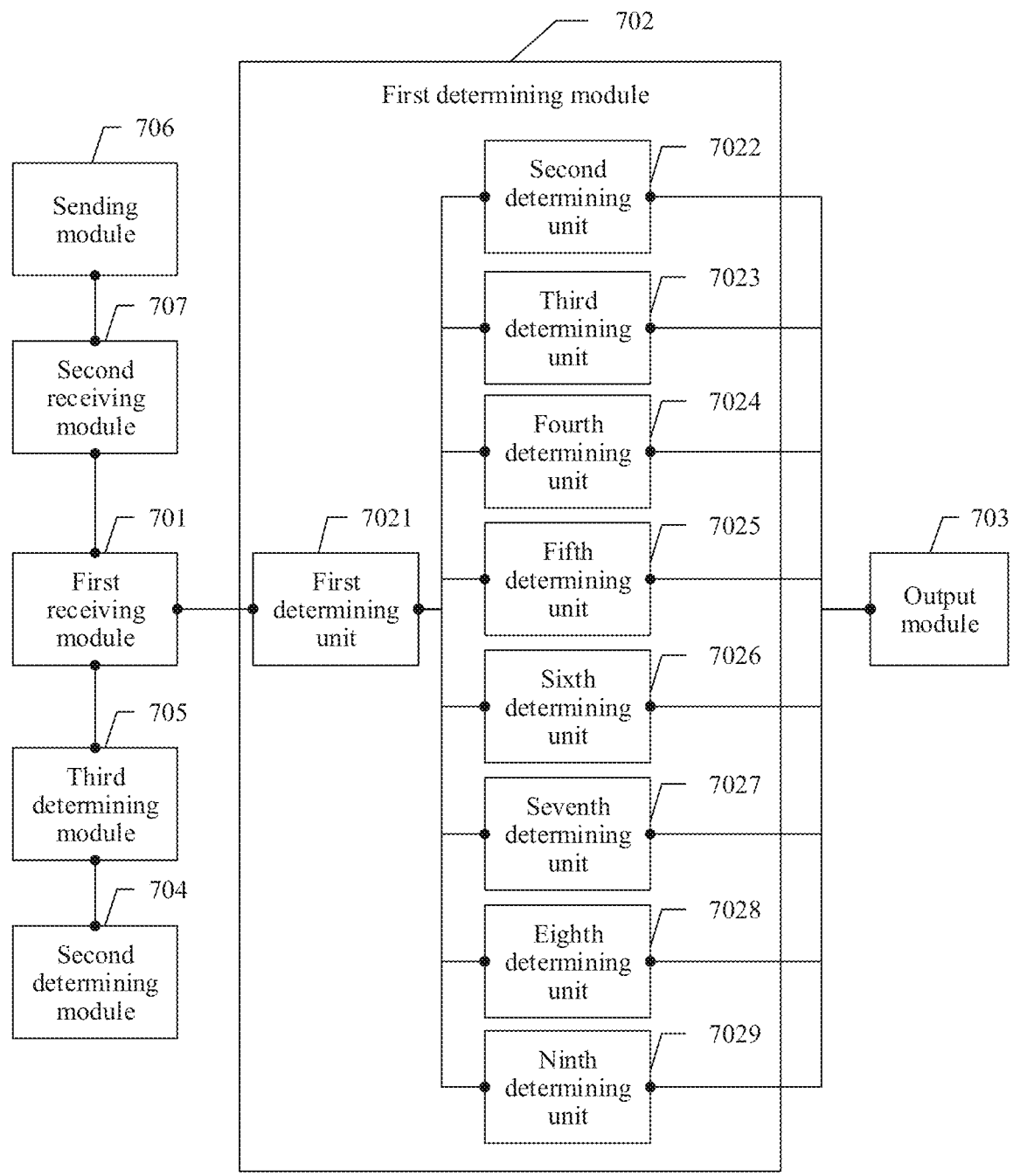
FIG. 7 is a schematic diagram of a vehicle-mounted device according to an embodiment of this application.

The foregoing describes the vehicle warning method in the embodiments of this application. The following describes a vehicle-mounted device in this application. Refer to FIG. 7. An embodiment of the vehicle-mounted device in the embodiments of this application includes:

a first receiving module 701, configured to receive a V2X message corresponding to a first vehicle;

a first determining module 702, configured to determine, based on the V2X message, that the first vehicle is a dangerous vehicle in a warning area, where the warning area is determined based on vehicle information of a second vehicle, and the vehicle information includes at least position information of the second vehicle and a vehicle size of the second vehicle; and an output module 703, configured to output warning information corresponding to the second vehicle.

In a possible implementation, in this embodiment, the warning area may include at least one of the following areas: a left blind spot warning area, a right blind spot warning area, a left lane change warning area, a right lane change warning area, a forward collision warning area, a pre-emergency electronic brake light, a left do-not-pass warning area, a right do-not-pass warning area, a left intersection movement assist area, and a right intersection movement assist area.

If a driver seat is located on a left side in the vehicle, the left blind spot warning area is located behind a left B-pillar of the second vehicle. An area length is positively correlated with a vehicle length, and an area width is positively correlated with a vehicle width. The right blind spot warning area is located behind a right rear view mirror of the second vehicle. An area length is positively correlated with the vehicle length, and an area width is positively correlated with the vehicle width.

If the driver seat is located on a right side in the vehicle, the right blind spot warning area is located behind a right B-pillar of the second vehicle. The area length is positively correlated with the vehicle length, and the area width is positively correlated with the vehicle width. The left blind spot warning area is located behind a left rear view mirror of the second vehicle. The area length is positively correlated with the vehicle length, and the area width is positively correlated with the vehicle width.

A definition of the left lane change warning area is similar to that of the left blind spot warning area. A definition of the right blind spot warning area is similar to that of the right blind spot warning area. A manner in which a server determines the left lane change warning area and/or the right lane change warning area is similar to a manner in which the server determines the left blind spot warning area and/or the right blind spot warning area. Details are not described herein again.

The forward collision warning area is located in front of the second vehicle. A width of the forward collision warning area is positively correlated with the vehicle width of the second vehicle. A length of the forward collision warning area is positively correlated with a vehicle speed of the second vehicle.

The emergency electronic brake light area is located in front of the second vehicle. A width of the emergency electronic brake light area is positively correlated to the vehicle width of the second vehicle. A length of the emergency electronic brake light area is positively correlated to the vehicle speed of the second vehicle. Specifically, the width of the emergency electronic brake light area is equal to the width of the forward collision warning area, and the length of the emergency electronic brake light area is greater than the length of the forward collision warning area.

The left intersection movement assist area is located in left front of a left side of a head of the second vehicle. A length of the left intersection movement assist area is positively correlated with the vehicle length of the second vehicle. A width of the left intersection movement assist area is positively correlated with the vehicle width of the second vehicle. The right intersection movement assist area is located in right front of a right side of the head of the second vehicle. A length of the right intersection movement assist area is positively correlated with the vehicle length of the second vehicle. A width of the right intersection movement assist area is positively correlated with the vehicle width of the second vehicle.

Specifically, if the warning area includes the left blind spot warning area, the V2X message includes position information of the first vehicle and an orientation of the first vehicle, and the first determining module 702 includes:

a first determining unit 7021, configured to determine a current spatial position of the first vehicle based on the position information of the first vehicle; and a second determining unit 7022, configured to: when the current spatial position of the first vehicle is in the left blind spot warning area, and the orientation of the first vehicle is the same as an orientation of the second vehicle, determine that the first vehicle is a dangerous vehicle in the left blind spot warning area.

Correspondingly, the warning information output by the output module 703 is used to indicate that there is a dangerous vehicle in the left blind spot warning area.

If the warning area includes the right blind spot warning area, the V2X message includes the position information of the first vehicle and the orientation of the first vehicle, and the first determining module 702 includes:

the first determining unit 7021, configured to determine the current spatial position of the first vehicle based on the position information of the first vehicle; and a third determining unit 7023, configured to: when the current spatial position of the first vehicle is in the right blind spot warning area, and the orientation of the first vehicle is the same as the orientation of the second vehicle, determine that the first vehicle is a dangerous vehicle in the right blind spot warning area.

Correspondingly, the warning information output by the output module 703 is used to indicate that there is a dangerous vehicle in the right blind spot warning area.

If the warning area includes the forward collision warning area, the V2X message includes the position information of the first vehicle, and the first determining module 702 includes:

the first determining unit 7021, configured to determine the current spatial position of the first vehicle based on the position information of the first vehicle; and a fourth determining unit 7024, configured to: when the current spatial position of the first vehicle is in the forward collision warning area, determine that the first vehicle is a dangerous vehicle in the forward collision warning area.

Correspondingly, the warning information output by the output module 703 is used to indicate that there is a dangerous vehicle in the forward collision warning area.

If the warning area includes the emergency electronic brake light warning area, the V2X message includes the position information of the first vehicle and a brake light status of the first vehicle, and the first determining module 702 includes:

the first determining unit 7021, configured to determine the current spatial position of the first vehicle based on the position information of the first vehicle; and a fifth determining unit 7025, configured to: when the current space position of the first vehicle is in the emergency electronic brake light area, and the brake light status of the first vehicle is on, determine that the first vehicle is a dangerous vehicle in the emergency electronic brake light area.

Correspondingly, the warning information output by the output module 703 is used to indicate that there is a dangerous vehicle in the emergency electronic brake light warning area.

If the warning area includes the left do-not-pass warning area, the V2X message includes the position information of the first vehicle, the orientation of the first vehicle, and a speed of the first vehicle, and the first determining module 702 includes:

the first determining unit 7021, configured to determine the current spatial position of the first vehicle based on the position information of the first vehicle; and a sixth determining unit 7026, configured to: when the current spatial position of the first vehicle is in the left do-not-pass warning area, the speed of the first vehicle is not zero, and the orientation of the first vehicle is opposite to the orientation of the second vehicle, determine that the first vehicle is a dangerous vehicle in the left do-not-pass warning area.

Correspondingly, the warning information output by the output module 703 is used to indicate that there is a dangerous vehicle in the left do-not-pass warning area.

If the warning area includes the right do-not-pass warning area, the V2X message includes the position information of the first vehicle, the orientation of the first vehicle, and the speed of the first vehicle, and the first determining module 702 includes:

the first determining unit 7021, configured to determine the current spatial position of the first vehicle based on the position information of the first vehicle; and a seventh determining unit 7027, configured to: when the current spatial position of the first vehicle is in the right do-not-pass warning area, the speed of the first vehicle is not zero, and the orientation of the first vehicle is opposite to the orientation of the second vehicle, determine that the first vehicle is a dangerous vehicle in the right do-not-pass warning area.

Correspondingly, the warning information output by the output module 703 is used to indicate that there is a dangerous vehicle in the right do-not-pass warning area.

If the warning area includes the left intersection movement assist warning area, the V2X message includes the position information of the first vehicle, the orientation of the first vehicle, and the speed of the first vehicle, and the first determining module 702 includes:

the first determining unit 7021, configured to determine the current spatial position of the first vehicle based on the position information of the first vehicle; and an eighth determining unit 7028, configured to: when the current spatial position of the first vehicle is in the left intersection movement assist warning area, the speed of the first vehicle is not zero, and the orientation of the first vehicle intersects the orientation of the second vehicle, determine that the first vehicle is a dangerous vehicle in the left intersection movement assist warning area.

Correspondingly, the warning information output by the output module 703 is used to indicate that there is a dangerous vehicle in the left intersection movement assist warning area.

If the warning area includes the right intersection movement assist warning area, the V2X message includes the position information of the first vehicle, the orientation of the first vehicle, and the speed of the first vehicle, and the first determining module 702 includes:

the first determining unit 7021, configured to determine the current spatial position of the first vehicle based on the position information of the first vehicle; and a ninth determining unit 7029, configured to: when the current spatial position of the first vehicle is in the right intersection movement assist warning area, the speed of the first vehicle is not zero, and the orientation of the first vehicle intersects the orientation of the second vehicle, determine that the first vehicle is a dangerous vehicle in the right intersection movement assist warning area.

Correspondingly, the warning information output by the output module 703 is used to indicate that there is a dangerous vehicle in the right intersection movement assist warning area.

In a possible implementation, the position information of the first vehicle includes a GPS measurement result of the first vehicle and at least one of the following: a GPS antenna position or GPS measurement precision of the first vehicle. The position information of the second vehicle includes a GPS measurement result of the second vehicle and at least one of the following: a GPS antenna position or GPS measurement precision of the second vehicle.

In a possible implementation, the vehicle-mounted device further includes:

a second determining module 704, configured to determine a current spatial position of the second vehicle based on the position information of the second vehicle and the vehicle size; and a third determining module 705, configured to determine the warning area based on the current spatial position of the second vehicle and the vehicle size.

In a possible implementation, the vehicle-mounted device further includes:

a sending module 706, configured to send the vehicle information of the second vehicle to the server, so that the server is enabled to determine the current spatial position of the second vehicle based on the position information of the second vehicle and the vehicle size, and determine a warning area based on the current spatial position of the second vehicle and the vehicle size; and a second receiving module 707, configured to receive the warning area sent by the server.

In a possible implementation, the output module 703 includes:

a display unit, configured to display the warning information on a dashboard of the second vehicle, where the warning information is used to indicate to a user that there is a dangerous vehicle in the warning area; or a voice unit, configured to prompt, through a voice, the user that there is a dangerous vehicle in the warning area.

Figure 5:
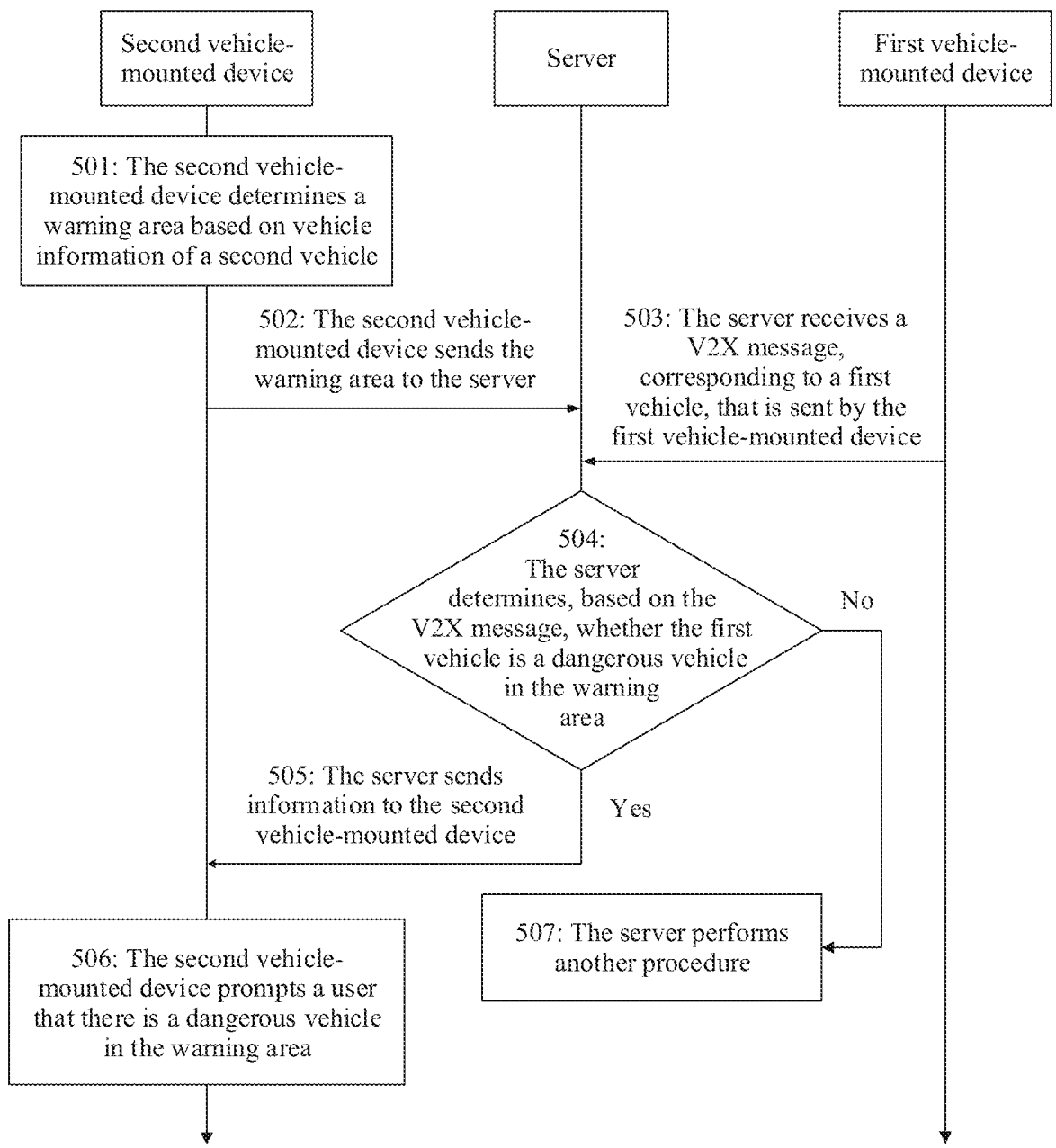
FIG. 5 is a flowchart of an embodiment of a vehicle warning method according to an embodiment of this application.

It should be noted that, in the embodiment corresponding to FIG. 7, a procedure performed by the vehicle-mounted device is similar to the method procedures described in the embodiments shown in FIG. 3 and FIG. 5, and details are not described herein again.

In this embodiment of this application, after the first receiving module 701 receives the V2X message corresponding to the first vehicle, the first determining module 702 determines, based on the V2X message, whether the first vehicle is a dangerous vehicle in the warning area. If yes, the output module 703 outputs the warning information corresponding to the second vehicle. The warning area corresponds to the vehicle information of the second vehicle. The vehicle information includes first position information and the vehicle size. In this embodiment, the warning area of the vehicle is set based on a position and a size of the vehicle. When there is a vehicle in the warning area, and the vehicle meets a warning condition of the warning area, an alarm is triggered. In other words, in this embodiment, a dangerous vehicle having a collision risk may be obtained through analysis without depending on a map. This is easy to implement, and may also avoid misjudgment caused by factors such as map precision and lane infringement of the vehicle, thereby improving recognition accuracy.

Figure 8:
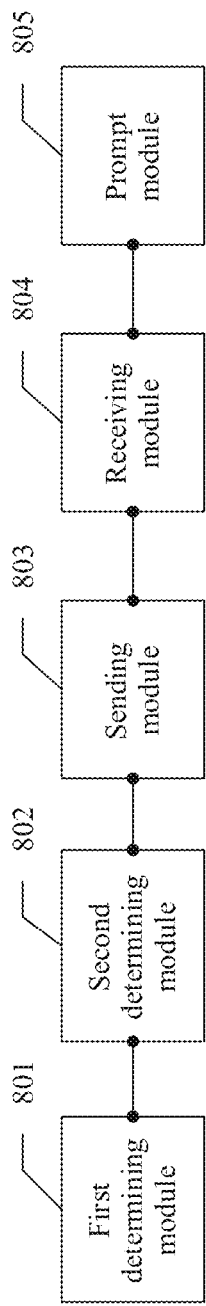
FIG. 8 is a schematic diagram of a vehicle-mounted device according to an embodiment of this application.

Refer to FIG. 8. Another embodiment of the vehicle-mounted device in the embodiments of this application includes:

a first determining module 801, configured to determine a current spatial position of a second vehicle based on position information of the second vehicle;

a second determining module 802, configured to determine a warning area of the second vehicle based on the current spatial position of the second vehicle and a vehicle size of the second vehicle;

a sending module 803, configured to send the warning area to a server, so that the server is enabled to determine, based on a vehicle-to-everything V2X message of a first vehicle, that the first vehicle is a dangerous vehicle in the warning area, and send a notification message to the vehicle-mounted device when determining that the first vehicle is a dangerous vehicle in the warning area;

a receiving module 804, configured to receive the notification message sent by the server; and a prompting module 805, configured to prompt a user that there is a dangerous vehicle in the warning area.

In this embodiment, the second determining module 802 may determine the warning area of the second vehicle based on the vehicle size of the second vehicle. When there is a vehicle located in the warning area, and the vehicle meets a warning condition of the warning area, the prompting module 804 gives an alarm. In other words, in this embodiment, a dangerous vehicle having a collision risk may be obtained through analysis without depending on a map. This is easy to implement, and may also avoid misjudgment caused by factors such as map precision and lane infringement of the vehicle, thereby improving recognition accuracy.

Figure 9:
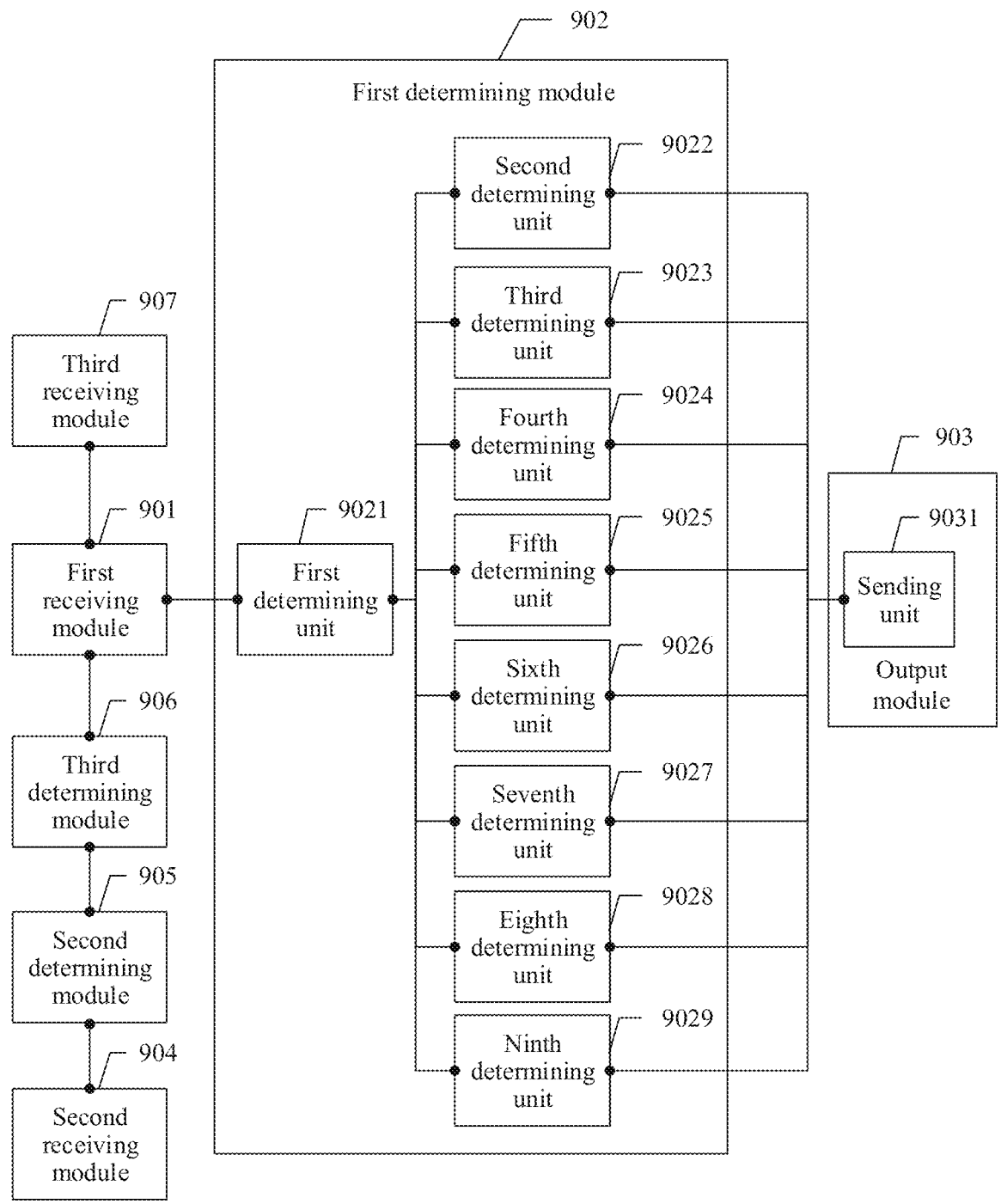
FIG. 9 is a schematic diagram of a server according to an embodiment of this application.

The following describes a server in this application. Refer to FIG. 9. An embodiment of the server in the embodiments of this application includes:

a first receiving module 901, configured to receive a V2X message corresponding to a first vehicle;

a first determining module 902, configured to determine, based on the V2X message, that the first vehicle is a dangerous vehicle in a warning area, where the warning area is determined based on vehicle information of a second vehicle, and the vehicle information includes at least position information of the second vehicle and a vehicle size of the second vehicle; and an output module 903, configured to output warning information corresponding to the second vehicle.

In a possible implementation, in this embodiment, the warning area may include at least one of the following areas: a left blind spot warning area, a right blind spot warning area, a left lane change warning area, a right lane change warning area, a forward collision warning area, a pre-emergency electronic brake light, a left do-not-pass warning area, a right do-not-pass warning area, a left intersection movement assist area, and a right intersection movement assist area.

If a driver seat is located on a left side in the vehicle, the left blind spot warning area is located behind a left B-pillar of the second vehicle. An area length is positively correlated with a vehicle length, and an area width is positively correlated with a vehicle width. The right blind spot warning area is located behind a right rear view mirror of the second vehicle. An area length is positively correlated with the vehicle length, and an area width is positively correlated with the vehicle width.

If the driver seat is located on a right side in the vehicle, the right blind spot warning area is located behind a right B-pillar of the second vehicle. The area length is positively correlated with the vehicle length, and the area width is positively correlated with the vehicle width. The left blind spot warning area is located behind a left rear view mirror of the second vehicle. The area length is positively correlated with the vehicle length, and the area width is positively correlated with the vehicle width.

A definition of the left lane change warning area is similar to that of the left blind spot warning area. A definition of the right blind spot warning area is similar to that of the right blind spot warning area. A manner in which the server determines the left lane change warning area and/or the right lane change warning area is similar to a manner in which the server determines the left blind spot warning area and/or the right blind spot warning area. Details are not described herein again.

The forward collision warning area is located in front of the second vehicle. A width of the forward collision warning area is positively correlated with the vehicle width of the second vehicle. A length of the forward collision warning area is positively correlated with a vehicle speed of the second vehicle.

The emergency electronic brake light area is located in front of the second vehicle. A width of the emergency electronic brake light area is positively correlated to the vehicle width of the second vehicle. A length of the emergency electronic brake light area is positively correlated to the vehicle speed of the second vehicle. Specifically, the width of the emergency electronic brake light area is equal to the width of the forward collision warning area, and the length of the emergency electronic brake light area is greater than the length of the forward collision warning area.

The left intersection movement assist area is located in left front of a left side of a head of the second vehicle. A length of the left intersection movement assist area is positively correlated with the vehicle length of the second vehicle. A width of the left intersection movement assist area is positively correlated with the vehicle width of the second vehicle. The right intersection movement assist area is located in right front of a right side of the head of the second vehicle. A length of the right intersection movement assist area is positively correlated with the vehicle length of the second vehicle. A width of the right intersection movement assist area is positively correlated with the vehicle width of the second vehicle.

Specifically, if the warning area includes the left blind spot warning area, the V2X message includes position information of the first vehicle and an orientation of the first vehicle, and the first determining module 902 includes:

a first determining unit 9021, configured to determine a current spatial position of the first vehicle based on the position information of the first vehicle; and a second determining unit 9022, configured to: when the current spatial position of the first vehicle is in the left blind spot warning area, and the orientation of the first vehicle is the same as an orientation of the second vehicle, determine that the first vehicle is a dangerous vehicle in the left blind spot warning area.

Correspondingly, the warning information output by the output module 903 is used to indicate that there is a dangerous vehicle in the left blind spot warning area.

If the warning area includes the right blind spot warning area, the V2X message includes the position information of the first vehicle and the orientation of the first vehicle, and the first determining module 902 includes:

the first determining unit 9021, configured to determine the current spatial position of the first vehicle based on the position information of the first vehicle; and a third determining unit 9023, configured to: when the current spatial position of the first vehicle is in the right blind spot warning area, and the orientation of the first vehicle is the same as the orientation of the second vehicle, determine that the first vehicle is a dangerous vehicle in the right blind spot warning area.

Correspondingly, the warning information output by the output module 903 is used to indicate that there is a dangerous vehicle in the right blind spot warning area.

If the warning area includes the forward collision warning area, the V2X message includes the position information of the first vehicle, and the first determining module 902 includes:

the first determining unit 9021, configured to determine the current spatial position of the first vehicle based on the position information of the first vehicle; and a fourth determining unit 9024, configured to: when the current spatial position of the first vehicle is in the forward collision warning area, determine that the first vehicle is a dangerous vehicle in the forward collision warning area.

Correspondingly, the warning information output by the output module 903 is used to indicate that there is a dangerous vehicle in the forward collision warning area.

If the warning area includes the emergency electronic brake light warning area, the V2X message includes the position information of the first vehicle and a brake light status of the first vehicle, and the first determining module 902 includes:

the first determining unit 9021, configured to determine the current spatial position of the first vehicle based on the position information of the first vehicle; and a fifth determining unit 9025, configured to: when the current space position of the first vehicle is in the emergency electronic brake light area, and the brake light status of the first vehicle is on, determine that the first vehicle is a dangerous vehicle in the emergency electronic brake light area.

Correspondingly, the warning information output by the output module 903 is used to indicate that there is a dangerous vehicle in the emergency electronic brake light warning area.

If the warning area includes the left do-not-pass warning area, the V2X message includes the position information of the first vehicle, the orientation of the first vehicle, and a speed of the first vehicle, and the first determining module 902 includes:

the first determining unit 9021, configured to determine the current spatial position of the first vehicle based on the position information of the first vehicle; and a sixth determining unit 9026, configured to: when the current spatial position of the first vehicle is in the left do-not-pass warning area, the speed of the first vehicle is not zero, and the orientation of the first vehicle is opposite to the orientation of the second vehicle, determine that the first vehicle is a dangerous vehicle in the left do-not-pass warning area.

Correspondingly, the warning information output by the output module 903 is used to indicate that there is a dangerous vehicle in the left do-not-pass warning area.

If the warning area includes the right do-not-pass warning area, the V2X message includes the position information of the first vehicle, the orientation of the first vehicle, and the speed of the first vehicle, and the first determining module 902 includes:

the first determining unit 9021, configured to determine the current spatial position of the first vehicle based on the position information of the first vehicle; and a seventh determining unit 9027, configured to: when the current spatial position of the first vehicle is in the right do-not-pass warning area, the speed of the first vehicle is not zero, and the orientation of the first vehicle is opposite to the orientation of the second vehicle, determine that the first vehicle is a dangerous vehicle in the right do-not-pass warning area.

Correspondingly, the warning information output by the output module 903 is used to indicate that there is a dangerous vehicle in the left do-not-pass warning area.

If the warning area includes the left intersection movement assist warning area, the V2X message includes the position information of the first vehicle, the orientation of the first vehicle, and the speed of the first vehicle, and the first determining module 902 includes:

the first determining unit 9021, configured to determine the current spatial position of the first vehicle based on the position information of the first vehicle; and an eighth determining unit 9028, configured to: when the current spatial position of the first vehicle is in the left intersection movement assist warning area, the speed of the first vehicle is not zero, and the orientation of the first vehicle intersects the orientation of the second vehicle, determine that the first vehicle is a dangerous vehicle in the left intersection movement assist warning area.

Correspondingly, the warning information output by the output module 903 is used to indicate that there is a dangerous vehicle in the left intersection movement assist warning area.

If the warning area includes the right intersection movement assist warning area, the V2X message includes the position information of the first vehicle, the orientation of the first vehicle, and the speed of the first vehicle, and the first determining module 902 includes:

the first determining unit 9021, configured to determine the current spatial position of the first vehicle based on the position information of the first vehicle; and a ninth determining unit 9029, configured to: when the current spatial position of the first vehicle is in the right intersection movement assist warning area, the speed of the first vehicle is not zero, and the orientation of the first vehicle intersects the orientation of the second vehicle, determine that the first vehicle is a dangerous vehicle in the right intersection movement assist warning area.

Correspondingly, the warning information output by the output module 903 is used to indicate that there is a dangerous vehicle in the right intersection movement assist warning area.

In a possible implementation, the position information of the first vehicle includes a GPS measurement result of the first vehicle and at least one of the following: a GPS antenna position or GPS measurement precision of the first vehicle. The position information of the second vehicle includes a GPS measurement result of the second vehicle and at least one of the following: a GPS antenna position or GPS measurement precision of the second vehicle.

In a possible implementation, the server further includes:

a second receiving module 904, configured to receive the vehicle information of the second vehicle sent by a vehicle-mounted device;

a second determining module 905, configured to determine a current spatial position of the second vehicle based on the position information of the second vehicle and the vehicle size; and a third determining module 906, configured to determine the warning area based on the current spatial position of the second vehicle and the vehicle size.

In a possible implementation, the server further includes:

a third receiving module 907, configured to receive a warning area sent by the vehicle-mounted device, where the warning area is determined by the vehicle-mounted device based on the vehicle information of the second vehicle.

In a possible implementation, the output module 903 includes a sending unit 9031, configured to send information to the vehicle-mounted device, so that the vehicle-mounted device is enabled to indicate to a user that there is a dangerous vehicle in the warning area.

In this embodiment of this application, after the first receiving module 901 receives the V2X message corresponding to the first vehicle, the first determining module 902 determines, based on the V2X message, whether the first vehicle is a dangerous vehicle in the warning area. If yes, the output module 903 outputs the warning information corresponding to the second vehicle. The warning area corresponds to the vehicle information of the second vehicle. The vehicle information includes first position information and the vehicle size. In this embodiment, the warning area of the vehicle is set based on a position and a size of the vehicle. When there is a vehicle in the warning area, and the vehicle meets a warning condition of the warning area, an alarm is triggered. In other words, in this embodiment, a dangerous vehicle having a collision risk may be obtained through analysis without depending on a map. This is easy to implement, and may also avoid misjudgment caused by factors such as map precision and lane infringement of the vehicle, thereby improving recognition accuracy.

Figure 10:
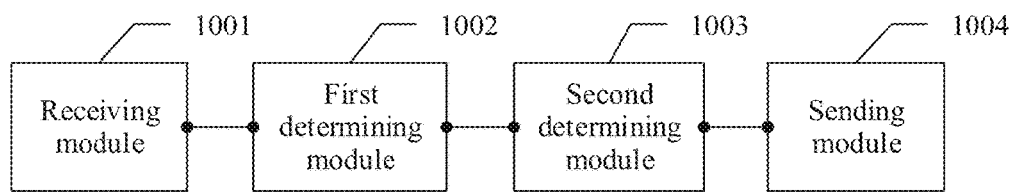
FIG. 10 is a schematic diagram of a server according to an embodiment of this application.

Refer to FIG. 10. Another embodiment of the server in the embodiments of this application includes:

a receiving module 1001, configured to receive vehicle information of a second vehicle sent by a vehicle-mounted device, where the vehicle information includes at least position information of the second vehicle and a vehicle size of the second vehicle;

a first determining module 1002, configured to determine a current spatial position of the second vehicle based on the position information of the second vehicle;

a second determining module 1003, configured to determine a warning area of the second vehicle based on the current spatial position of the second vehicle and the vehicle size; and a sending module 1004, configured to send the warning area to the vehicle-mounted device, so that the vehicle-mounted device is enabled to determine, based on a vehicle to everything V2X message of a first vehicle, that the first vehicle is a dangerous vehicle in the warning area, and output warning information.

In this embodiment, the second determining module 1003 may determine the warning area of the second vehicle based on the vehicle size of the second vehicle. When there is a vehicle located in the warning area, and the vehicle meets a warning condition of the warning area, the sending module 1004 gives an alarm. In other words, in this embodiment, a dangerous vehicle having a collision risk may be obtained through analysis without depending on a map. This is easy to implement, and may also avoid misjudgment caused by factors such as map precision and lane infringement of the vehicle, thereby improving recognition accuracy.

Figure 11:
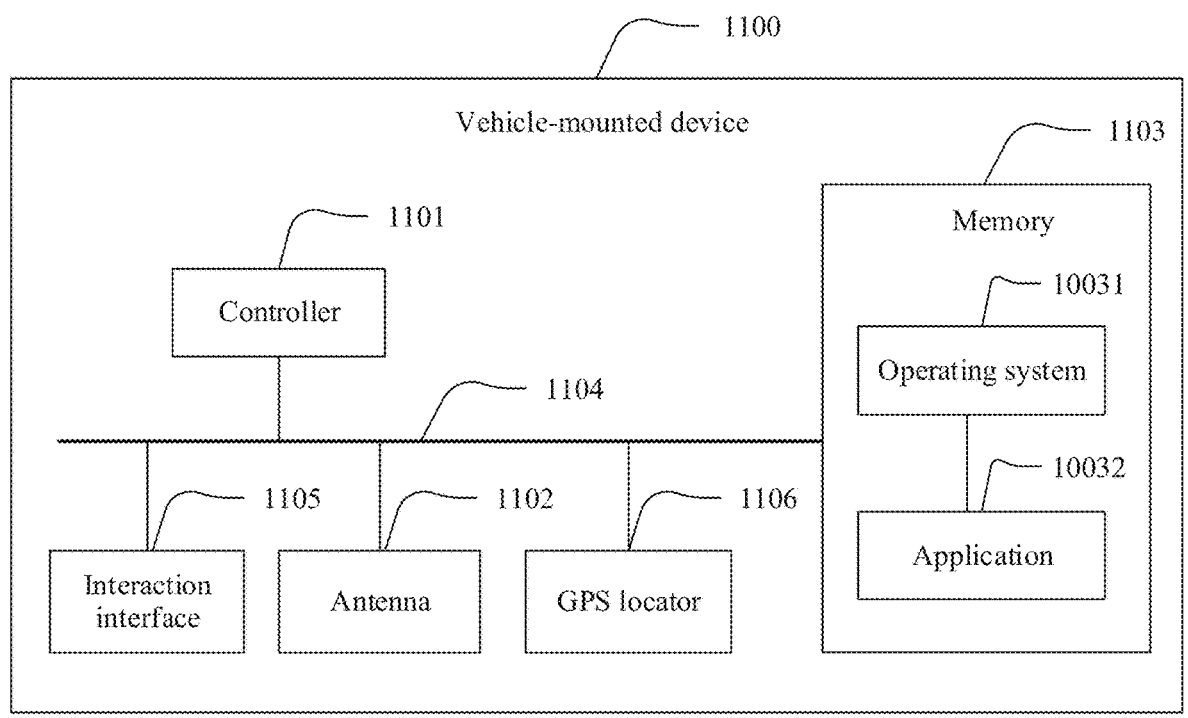
FIG. 11 is a schematic diagram of a vehicle-mounted device according to an embodiment of this application.

The foregoing describes the vehicle-mounted device and the server in this application from a perspective of a functional module. The following describes the vehicle-mounted device and the server in this application from a perspective of physical hardware. Refer to FIG. 11. FIG. 11 is a schematic diagram of a structure of a vehicle-mounted device 1100 according to an embodiment of this application. As shown in FIG. 11, the vehicle-mounted device 1100 may include at least one controller 1101, for example, a CPU, at least one antenna 1102, a memory 1103, at least one communications bus 1104, an interaction interface 1105, and a GPS locator 1106. The communications bus 1104 is configured to implement connection and communication between these components. The antenna 1102 may be configured to send and receive information data. The memory 1103 may include a high-speed random access memory (RAM), and may further include a non-volatile memory (non-volatile memory), for example, at least one magnetic disk storage. Optionally, the memory 1103 may include at least one vehicle-mounted storage device far away from the controller 1101. The GPS locator 1106 is configured to record current positioning data.

The memory 1103 stores the following elements: an executable module or a data structure, a subset thereof, or an extended set thereof.

An operating system 11031 includes various system programs, and is configured to implement various basic services and process hardware-based tasks.

An application program 11032 includes various application programs such as a device control service program and a device identification service program, and is configured to implement various application services.

In some implementations, the interaction interface 1105 may be configured to input and output information.

Specifically, the controller 1101 is configured to invoke a program stored in the memory 1103, so that the vehicle-mounted device 1100 is enabled to perform the steps in the method embodiment corresponding to FIG. 3 or FIG. 5.

Figure 12:
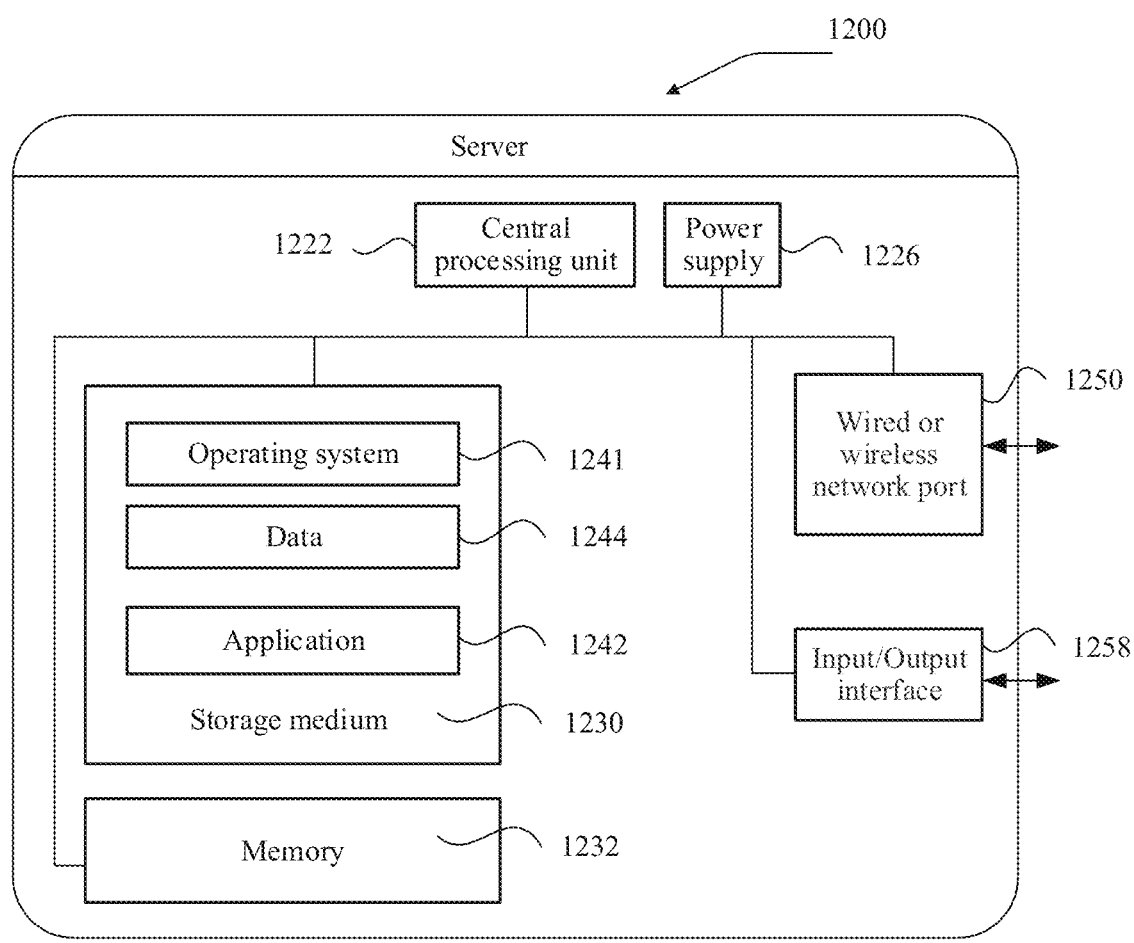
FIG. 12 is a schematic diagram of a server according to an embodiment of this application.

Refer to FIG. 12. FIG. 12 is a schematic diagram of a structure of a server according to an embodiment of the present invention. The server 1200 may have a relatively large difference due to different configuration or performance, and may include at least one central processing unit (CPU) 1222 (for example, one or more processors), a memory 1232, at least one storage medium 1230 (for example, at least one storage device) that store an application program 1242 or data 1244. The memory 1232 and the storage medium 1230 may be transient storage or persistent storage. A program stored in the storage medium 1230 may include at least one module (not shown in the figure), and each module may include a series of instruction operations for the server. Further, the central processing unit 1222 may be configured to communicate with the storage medium 1230, to perform, on the server 1200, a series of instruction operations in the storage medium 1230.

The server 1200 may further include at least one power supply 1226, at least one wired or wireless network interface 1250, at least one input/output interface 1258, and/or at least one operating system 1241 such as Windows Server™, Mac OS X™, Unix™, Linux™, and FreeBSD™.

In the foregoing embodiments, steps performed by the server in the method embodiment shown in FIG. 3 or FIG. 5 may be based on the structure of the server shown in FIG. 12.

An embodiment of this application further provides a computer storage medium. The computer storage medium is configured to store a computer software instruction used by the foregoing vehicle-mounted device or server, and the computer software instruction includes a program designed for the vehicle-mounted device or the server.

The vehicle-mounted device may be the vehicle-mounted device described in FIG. 3 and FIG. 5.

The server may be the server described in FIG. 3 and FIG. 5.

An embodiment of this application further provides a computer program product. The computer program product includes a computer software instruction. The computer software instruction may be loaded by a processor to implement a procedure of the vehicle warning method in any one of FIG. 3 to FIG. 5.

All or some of the foregoing embodiments may be implemented through software, hardware, firmware, or any combination thereof. When the software is used to implement the embodiments, all or some of the embodiments may be implemented in a form of a computer program product.

The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive (SSD)), or the like.

It may be clearly understood by a person skilled in the art that, for convenient and brief description, for a detailed working process of the foregoing system, apparatuses, and units, refer to a corresponding process in the foregoing method embodiments, and details are not described herein again.

In the several embodiments provided in this application, it should be understood that the disclosed system, apparatuses, and methods may be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on achievable objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that stores program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A vehicle warning method, comprising:
receiving, by a vehicle-to-everything (V2X) device, a V2X message corresponding to a first vehicle;
determining, by the V2X device, a warning area based on vehicle information of a second vehicle, wherein the vehicle information comprises position information of the second vehicle and a vehicle size of the second vehicle;
determining, by the V2X device based on the V2X message, whether the first vehicle is in the warning area; and
outputting, by the V2X device, warning information corresponding to the first vehicle to the second vehicle;
wherein the warning area comprises a left blind spot warning area or a right blind spot warning area, the vehicle size comprises a vehicle length and a vehicle width, and the vehicle information further comprises a driver seat position, the method further comprising;
responsive to the driver seat position being on a left side in the second vehicle, the left blind spot warning area being behind a left B-pillar of the second vehicle, positively correlating a length of the left blind spot warning area with the vehicle length;
positively correlating a width of the left blind spot warning area with the vehicle width, the right blind spot warning area being behind a right rear view mirror of the second vehicle;
positively correlating a length of the right blind spot warning area with the vehicle length; and
positively correlating a width of the right blind spot warning area with the vehicle width; and
responsive to the driver seat position being on a right side in the second vehicle, the right blind spot warning area being behind a right B-pillar of the second vehicle;
positively correlating the length of the right blind spot warning area with the vehicle length;
positively correlating the width of the right blind spot warning area with the vehicle width, the left blind spot warning area being behind a left rear view mirror of the second vehicle;
positively correlating the length of the left blind spot warning area with the vehicle length; and
positively correlating the width of the left blind spot warning area with the vehicle width.

2. The method according to claim 1, wherein the V2X message comprises position information of the first vehicle and an orientation of the first vehicle; the determining, by the V2X device based on the V2X message, whether the first vehicle is in a the warning area comprises: determining, by the V2X device, a current spatial position of the first vehicle based on the position information of the first vehicle, and responsive to the current spatial position of the first vehicle being in the left blind spot warning area or the right blind spot warning area, and the orientation of the first vehicle is the same as an orientation of the second vehicle, determining, by the V2X device, that the first vehicle is in the left blind spot warning area or the right blind spot warning area; and indicating, based on the warning information, the first vehicle is in the left blind spot warning area or the right blind spot warning area.

3. The method according to claim 1, wherein the warning area comprises a forward collision warning area, the vehicle size comprises the vehicle width, and the vehicle information further comprises a vehicle speed; and
the forward collision warning area is in front of the second vehicle, a width of the forward collision warning area is positively correlated with the vehicle width, and a length of the forward collision warning area is positively correlated with the vehicle speed.

4. The method according to claim 3, wherein the V2X message comprises position information of the first vehicle;
the determining, by the V2X device based on the V2X message, whether the first vehicle is in the warning area comprises:
determining, by the V2X device, a current spatial position of the first vehicle based on the position information of the first vehicle, and
responsive to the current spatial position of the first vehicle being in the forward collision warning area, determining, by the V2X device, that the first vehicle is in the forward collision warning area; and
indicating, based on the warning information, the first vehicle is in the forward collision warning area.

5. The method according to claim 3, wherein the warning area further comprises an emergency electronic brake light area; the emergency electronic brake light area is in front of the second vehicle, a width of the emergency electronic brake light area is equal to the width of the forward collision warning area, a length of the emergency electronic brake light area is positively correlated with the length of the forward collision warning area, and the emergency electronic brake light area comprises the forward collision warning area.

6. The method according to claim 1, wherein the warning area comprises a left do-not-pass warning area or a right do-not-pass warning area, and the vehicle size comprises the vehicle width and the vehicle length;
the left do-not-pass warning area is located in left front of a left side of a head of the second vehicle, a length of a left do-not-pass area is positively correlated with the vehicle length, a width of the left do-not-pass area is positively correlated with the vehicle width, and the length of the left do-not-pass area is greater than the width of the left do-not-pass area; and
the right do-not-pass warning area is located in right front of a right side of the head of the second vehicle, a length of a right do-not-pass area is positively correlated with the vehicle length, a width of the right do-not-pass area is positively correlated with the vehicle width, and the length of the right do-not-pass area is greater than the width of the right do-not-pass area.

7. The method according to claim 1, wherein the warning area comprises a left intersection movement assist area or a right intersection movement assist area, and the vehicle size comprises the vehicle width and the vehicle length;
the left intersection movement assist area is in left front of a left side of a head of the second vehicle, a length of the left intersection movement assist area is positively correlated with the vehicle length, and a width of the left intersection movement assist area is positively correlated with the vehicle width; and
a right assist area is in right front of a right side of the head of the second vehicle, a length of the right intersection movement assist area is positively correlated with the vehicle length, and a width of the right intersection movement assist area is positively correlated with the vehicle width.

8. The method according to claim 1, wherein the position information comprises: a GPS measurement result and at least one of the following: a GPS antenna position or GPS measurement precision.

9. The method according to claim 8, wherein the V2X device is a vehicle-mounted device; and
before the determining, by the V2X device based on the V2X message, whether the first vehicle is in the warning area, the method further comprises:
determining, by the V2X device, a current spatial position of the second vehicle based on the position information of the second vehicle and the vehicle size, and
determining, by the V2X device, the warning area based on the current spatial position of the second vehicle and the vehicle size.

10. A vehicle-mounted device, comprising:
a memory configured to store a program; and
a processor configured to execute the program, when the program is executed by the processor, the processor causes the vehicle-mounted device to:
receive, by a vehicle-to-everything (V2X) device, a V2X message corresponding to a first vehicle;
determine, based on vehicle information of a second vehicle and the vehicle information comprises at least position information of the second vehicle and a vehicle size of the second vehicle, a warning area;
determine, by the V2X device based on the V2X message, whether the first vehicle is in the warning area, and
output, by the V2X device, warning information corresponding to the first vehicle to the second vehicle;
the warning area comprises a left blind spot warning area or a right blind spot warning area, the vehicle size comprises a vehicle length and a vehicle width, and the vehicle information further comprises a driver seat position;
responsive to the driver seat position being located on a left side in the second vehicle, the left blind spot warning area being located behind a left B-pillar of the second vehicle, positively correlate a length of the left blind spot warning area with the vehicle length;
positively correlate a width of the left blind spot warning area with the vehicle width, the right blind spot warning area is located behind a right rear view mirror of the second vehicle;
positively correlate a length of the right blind spot warning area with the vehicle length, and
positively correlate a width of the right blind spot warning area with the vehicle width; and responsive to the driver seat position being on a right side in the second vehicle, the right blind spot warning area is located behind a right B-pillar of the second vehicle, positively correlate the length of the right blind spot warning area with the vehicle length;

positively correlate the width of the right blind spot warning area with the vehicle width, the left blind spot warning area is located behind a left rear view mirror of the second vehicle;

positively correlate the length of the left blind spot warning area with the vehicle length, and positively correlate the width of the left blind spot warning area with the vehicle width.

11. The vehicle-mounted device according to claim 10, wherein the V2X message comprises position information of the first vehicle and an orientation of the first vehicle; the determination, by the V2X device based on the V2X message, whether the first vehicle is in the warning area comprises: determine, by the V2X device, a current spatial position of the first vehicle based on the position information of the first vehicle, and responsive to the current spatial position of the first vehicle is being in the left blind spot warning area or the right blind spot warning area, and the orientation of the first vehicle is the same as an orientation of the second vehicle, determine, by the V2X device, that the first vehicle is in the left blind spot warning area or the right blind spot warning area; and indicate, based on the warning information, the first vehicle is in the left blind spot warning area or the right blind spot warning area.

12. The vehicle-mounted device according to claim 10, wherein the warning area comprises a forward collision warning area, the vehicle size comprises the vehicle width, and the vehicle information further comprises a vehicle speed; and the forward collision warning area is in front of the second vehicle, a width of the forward collision warning area is positively correlated with the vehicle width, and a length of the forward collision warning area is positively correlated with the vehicle speed.

13. The vehicle-mounted device according to claim 12, wherein the V2X message comprises position information of the first vehicle;

the determination, by the V2X device based on the V2X message, whether the first vehicle is in the warning area comprises:

determine, by the V2X device, a current spatial position of the first vehicle based on the position information of the first vehicle, and responsive to the current spatial position of the first vehicle is being in the forward collision warning area, determine, by the V2X device, that the first vehicle is in the forward collision warning area; and indicate, based on the warning information, the first vehicle is in the forward collision warning area.

14. The vehicle-mounted device according to claim 12, wherein the warning area further comprises an emergency electronic brake light area; the emergency electronic brake light area is located in front of the second vehicle, a width of the emergency electronic brake light area is equal to the width of the forward collision warning area, a length of the emergency electronic brake light area is positively correlated with the length of the forward collision warning area, and the emergency electronic brake light area comprises the forward collision warning area.

15. The vehicle-mounted device according to claim 12, wherein the warning area comprises a left do-not-pass warning area or a right do-not-pass warning area, and the vehicle size comprises the vehicle width and the vehicle length;

the left do-not-pass warning area is in left front of a left side of a head of the second vehicle, a length of a left do-not-pass area is positively correlated with the vehicle length, a width of the left do-not-pass area is positively correlated with the vehicle width, and the length of the left do-not-pass area is greater than the width of the left do-not-pass area; and the right do-not-pass warning area is in right front of a right side of the head of the second vehicle, a length of a right do-not-pass area is positively correlated with the vehicle length, a width of the right do-not-pass area is positively correlated with the vehicle width, and the length of the right do-not-pass area is greater than the width of the right do-not-pass area.

16. The vehicle-mounted device according to claim 10, wherein the warning area comprises a left intersection movement assist area or a right intersection movement assist area, and the vehicle size comprises a vehicle width and a vehicle length;

the left intersection movement assist area is in left front of a left side of a head of the second vehicle, a length of the left intersection movement assist area is positively correlated with the vehicle length, and a width of the left intersection movement assist area is positively correlated with the vehicle width; and a right assist area is in right front of a right side of the head of the second vehicle, a length of the right intersection movement assist area is positively correlated with the vehicle length, and a width of the right intersection movement assist area is positively correlated with the vehicle width.

17. The vehicle-mounted device according to claim 10, wherein prior to the determination, by the V2X device based on the V2X message, whether the first vehicle is in the warning area:

determine, by the V2X device, a current spatial position of the second vehicle based on the position information of the second vehicle and the vehicle size, and determine, by the V2X device, the warning area based on the current spatial position of the second vehicle and the vehicle size.

\* \* \* \* \*